(12) United States Patent
Segawa et al.

(10) Patent No.: US 9,951,800 B2
(45) Date of Patent: Apr. 24, 2018

(54) SURFACE PLASMA ACTUATOR

(71) Applicant: National Institute of Advanced Industrial Science and Technology, Tokyo (JP)

(72) Inventors: Takehiko Segawa, Tsukuba (JP); Takayuki Matsunuma, Tsukuba (JP); Timothy Jukes, Tsukuba (JP)

(73) Assignee: NATIONAL INSTITUTE OF ADVANCED INDUSTRIAL SCIENCE AND TECHNOLOGY, Tokyo (JP)

(*) Notice: Subject to any disclaimer, the term of this patent is extended or adjusted under 35 U.S.C. 154(b) by 391 days.

(21) Appl. No.: 14/420,015

(22) PCT Filed: Jun. 24, 2013

(86) PCT No.: PCT/JP2013/067265
§ 371 (c)(1),
(2) Date: Apr. 30, 2015

(87) PCT Pub. No.: WO2014/024590
PCT Pub. Date: Feb. 13, 2014

(65) Prior Publication Data
US 2015/0267727 A1   Sep. 24, 2015

(30) Foreign Application Priority Data

Aug. 8, 2012 (JP) ................................ 2012-175614
Sep. 7, 2012 (JP) ................................ 2012-197259
Oct. 23, 2012 (JP) ................................ 2012-234105

(51) Int. Cl.
*B60L 5/00* (2006.01)
*F15D 1/00* (2006.01)
(Continued)

(52) U.S. Cl.
CPC .............. *F15D 1/0075* (2013.01); *B60L 5/20* (2013.01); *F01D 11/20* (2013.01); *F03D 80/00* (2016.05);
(Continued)

(58) Field of Classification Search
CPC .... B60L 5/00; B60L 5/04; B60L 5/045; B60L 5/08; B60L 5/18; B60L 5/20; B60L 5/205; B60L 5/22; B60L 5/24
See application file for complete search history.

(56) References Cited

U.S. PATENT DOCUMENTS 7,380,756 B1      6/2008  Enloe et al.
7,854,304 B2 *   12/2010  Mysyrowicz ........... B60L 5/005
                                                           191/10
(Continued)

FOREIGN PATENT DOCUMENTS

JP    H11-69502     3/1999
JP    3297355       7/2002
(Continued)

OTHER PUBLICATIONS

International Search Report dated Sep. 10, 2013, which issued during prosecution of International Application No. PCT/JP2013/067265, which corresponds to the present application.
(Continued)

*Primary Examiner* — R. J. McCarry, Jr.
(74) *Attorney, Agent, or Firm* — Troutman Sanders LLP

(57) ABSTRACT

A surface plasma actuator includes a conducting wire attached to a surface of a target object and electrically insulated from the target object. Surface plasma is generated along a neighborhood of the conducting wire by applying a pulse voltage between the conducting wire and a conductive portion on a side of the target object. An induced gas flow is generated by the surface plasma.

18 Claims, 26 Drawing Sheets

(51) Int. Cl.
| | | |
|---|---|---|
| B60L 5/20 | (2006.01) | |
| F04D 29/38 | (2006.01) | |
| H05H 1/24 | (2006.01) | |
| F04D 29/68 | (2006.01) | |
| F01D 11/20 | (2006.01) | |
| F03D 80/00 | (2016.01) | |

(52) U.S. Cl.
CPC ........... *F04D 29/38* (2013.01); *F04D 29/681* (2013.01); *H05H 1/2406* (2013.01); *B60L 5/005* (2013.01); *B60L 2200/26* (2013.01); *B64C 2230/12* (2013.01); *F05B 2240/30* (2013.01); *F05D 2270/172* (2013.01); *H05H 2001/2412* (2013.01); *Y02E 10/721* (2013.01); *Y02T 50/166* (2013.01); *Y02T 50/671* (2013.01)

(56) References Cited

U.S. PATENT DOCUMENTS

| | | |
|---|---|---|
| 7,999,173 B1 | 8/2011 | Ashpis |
| 8,941,291 B2 | 1/2015 | Kim et al. |
| 2009/0169356 A1 | 7/2009 | Wadia et al. |
| 2010/0040453 A1 | 2/2010 | Vo |
| 2012/0152198 A1 | 6/2012 | Kim et al. |

FOREIGN PATENT DOCUMENTS

| | | |
|---|---|---|
| JP | 2004-124813 | 4/2004 |
| JP | 2005-130595 | 5/2005 |
| JP | 2008-001354 | 1/2008 |
| JP | 2008-016222 A | 1/2008 |
| JP | 2008-159336 | 7/2008 |
| JP | 2008-270110 | 11/2008 |
| JP | 4178545 | 11/2008 |
| JP | 2008-289801 A | 12/2008 |
| JP | 4271004 | 6/2009 |
| JP | 2009-242172 | 10/2009 |
| JP | 2010-061919 | 3/2010 |
| JP | 2010-179829 A | 8/2010 |
| JP | 2011-508157 A | 3/2011 |
| JP | 2011-231928 A | 11/2011 |
| JP | 2012-130115 A | 7/2012 |
| WO | 02081304 A1 | 10/2002 |
| WO | 2011/024736 | 3/2011 |

OTHER PUBLICATIONS

Daniel K.Van Ness II. "Tip Clearance Flow Visualization of a Turbine Blade Cascade with Active and Passive Flow Control" Proceeding of ASME Turbo Expo 2008, Power for Land, Sea and Air GT2008, Jun. 9-13, 2008.

European Search Report dated Mar. 31, 2016, issued in the corresponding European Patent Application No. 13828681.0.

Segawa, T., et al., "Properties of Flow Induced by Stringy DBD Plasma Actuator", Annual Meeting 2012, Japan Society of Fluid Mechanics (with partial English translation).

Segawa, T., et al, "Feedback Control of Flow Separation on NACA0024 Airfoil under Periodic Wall Oscillation by Means of DBD Plasma Actuator and FBG Sensor", AIAA 2013-1117.

T. Mitsumoji, et al., "A study on control method of flow around pantograph panhead with plasma actuator by using LES", 22nd Japan Society of Mechanical Engineers Environmental Engineering Synthesis Symposium 2012, The Japan Society of Mechanical Engineers, Jul. 3, 2012, p. 93-96.

Japanese Office Action dated Dec. 6, 2016 for the corresponding Japanese Patent Application No. 2013-133068.

Japanese Office Action dated Feb. 6, 2018 for the corresponding Japanese Patent Application No. 2017-068822.

\* cited by examiner

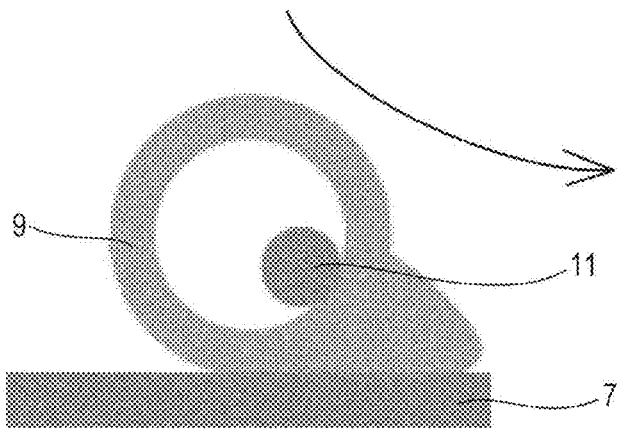
FIG. 11
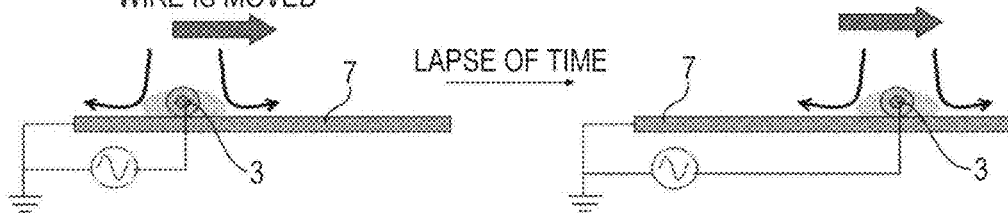
FIG. 12
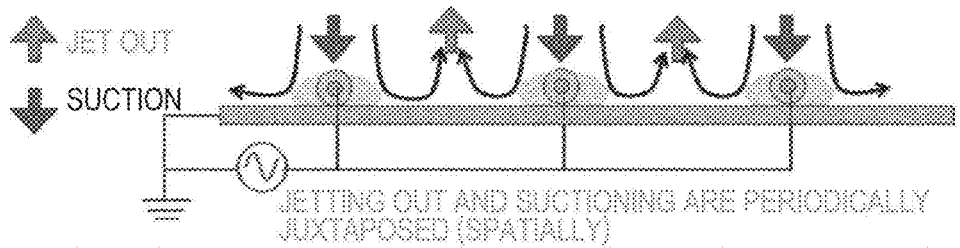
FIG. 13
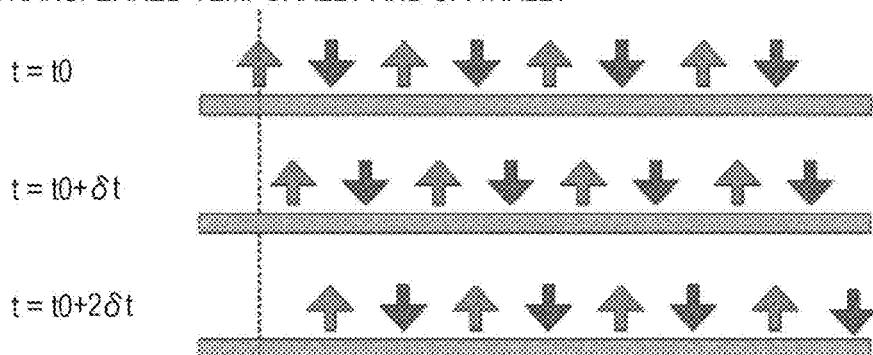

FIG. 14

| ELECTRODE MATERIAL | Merits | Demerits | Volume Resistivity [μΩ cm] | | | |
|---|---|---|---|---|---|---|
| | | | 100 °C | 300 °C | 700 °C | 1,300 °C |
| Copper | ① Material cost is low.<br>② Conductivity is good (low resistivity).<br>③ When the insulating material is flexible (e.g., a polymer), copper may be formed into a double side copper clad plate by rolling. Thus, copper can provide a plasma actuator whose both sides are etchable.<br>④ When used under a low temperature, copper may be connected with cable by soldering.<br>⑤ Plating or vapor deposited. | ① Easily oxidized under high temperature environment and electrode may be degraded.<br>② Melting point is relatively low (1083.4 °C). | 2.23 | 3.6 | 6.7 | — |
| Nickel | ① Material cost is relatively low.<br>② Electrode is not easily oxidized even under high temperature environment.<br>③ Resistively is relatively low.<br>④ Electrode is formable by plating and vapor deposition.<br>⑤ Melting point is relatively high (1,455 °C). | ① Not solderable. | 10.3 | 22.5 | 40 | 109 (1,500 °C) |
| Tungsten | ① Resistivity is low.<br>② Not oxidized. | ① Relatively expensive.<br>② Rigidity is high.<br>③ Not to be vapor deposited. | 7.3 | 12.4 | 24 | 39 |
| Gold | ① Resistivity is low.<br>② Not oxidized.<br>③ Electrode is formable by sputtering. | ① Very expensive.<br>② Melting point is relatively low (1064.43 °C). | 2.28 | 4.63 | 8.6 | — |
| Silver | ① Resistivity is low (lower than copper). | ① Easily oxidized.<br>② Melting point is relatively low (961.8 °C). | 2.08 | 3.34 | 6.1 | 19.4 |
| Platinum | ① Not oxidized.<br>② Melting point is high (1764 °C).<br>③ Resistivity is relatively low. | ① Extremely expensive. | 13.6 | 21 | 34.3 | 48.3 |
| Titan | ① Melting point is high (1660 °C). | Resistivity is high. | 55 (20 °C) | — | — | — |

FIG. 15

| INSULATING MATERIAL | Merits | Demerits |
|---|---|---|
| Polyimide | ① Typically used as insulating material in electronic circuit board, and reliability is high. ② Usable up to relatively high temperature (approximately 300 °C). ③ Relative permittivity is relatively small (up to 3.5). ④ In forming sheet plasma actuator, copper clad laminated sheet with copper film rolled onto polyimide surface or both surfaces is easily available. Electrode is easily formable by one surface etching or both surface etching. ⑤ Sheet polyimide may be thinned to be 25 μm, and plasma is generated by application of low voltage. ⑥ Transparent. | ① Use under high temperature above 300 °C is difficult. ② Difficult to be thickened to have more than 125 μm. ③ Polyimide coated wire does exist, but is not so popular as Teflon. ④ Not to be applied with high voltage. |
| Teflon | ① Usable up to relatively high temperature (approximately 250 °C). ② Relative permittivity is small (up to 2.5). ③ In forming sheet plasma actuator, copper clad laminated sheet with copper film rolled onto Teflon surface or both surfaces is easily available. Electrode is easily formable by one surface etching or both surface etching. ④ Sheet Teflon is thick to be 150 μm to several mm thick, applicable with high voltage. Strong plasma and flow are generated. ⑤ In forming wire plasma actuator, Teflon coated wire is easily available, and various specifications are available. | ① Sheet type of 160 μm or less is not easily available. ② Adhesiveness (compatibility with adhesive) is bad. |
| Acryl | ① Economical, transparent and colorless. ② Thick plate of several mm to several 10 mm is available, and used when voltage of several 10 kV is applied. | ① Usable temperature is 100 °C or lower. |
| Parylene parylene | ① Since insulation film is formed not by physical bonding such as vapor deposition but by chemical polymerization, insulating layer free of pin holes is locally developable. Thickness is available in the range of several μm to 30 μm. ② Usable up to relatively high temperature (300 °C). | ① Unless sized to be inserted in vacuum container, parylene coating is not possible. ② Coating is highly costly. |
| Alumina | ① Applicable to high temperature environment. ② Widely used as turbine parts. ③ Depending on composition, tensile strength and bending strength are great. | ① May be torn or broken. ② Difficult to form fine insulating film. ③ Electric resistivity is great under normal temperature, and electric resistivity is radically increased in accordance with temperature rise. |
| Quartz glass | ① Melting point is high (1,720 °C). ② Electric resistivity is high. ③ Colorless and transparent. ④ Tube of several specifications are commercially available, and inner diameter is available in the range of 0.1 to several mm. | ① Easily broken |
| Sapphire | ① Melting point is high (2,053 °C). ② Electric resistivity is high (smaller than quartz glass). ③ Colorless and transparent. | ① Tensile strength and bending strength are greater than quartz glass ② Expensive ③ Sapphire tube is available, but the possible smallest inner diameter is approximately 1 mm. Bending work is highly costly. |

FIG. 29
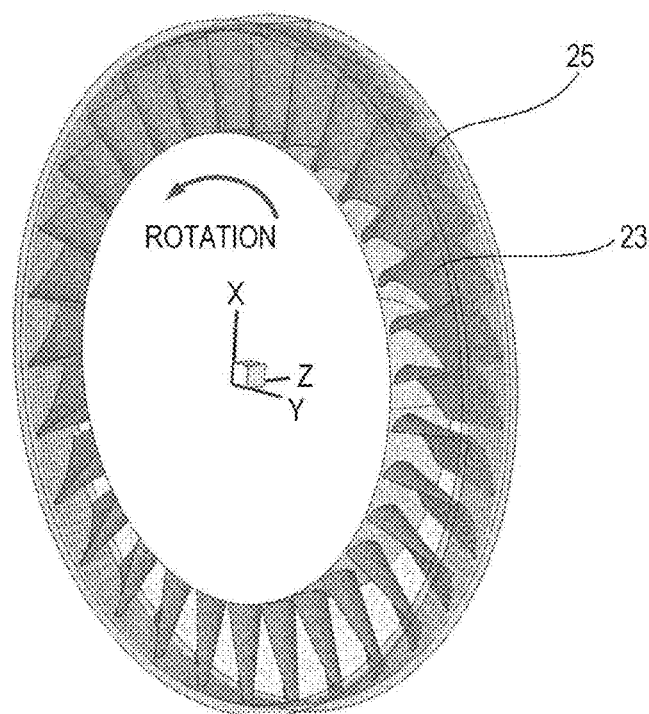
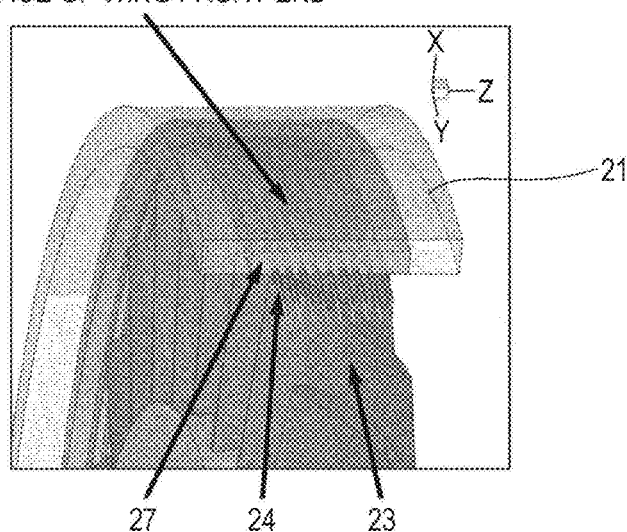
PLASMA GENERATION SUPPRESSES
LEAKAGE OF WING FRONT END

FIG. 31
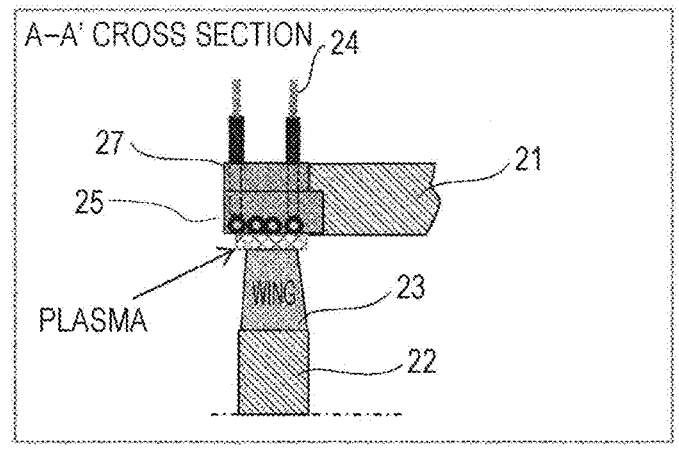
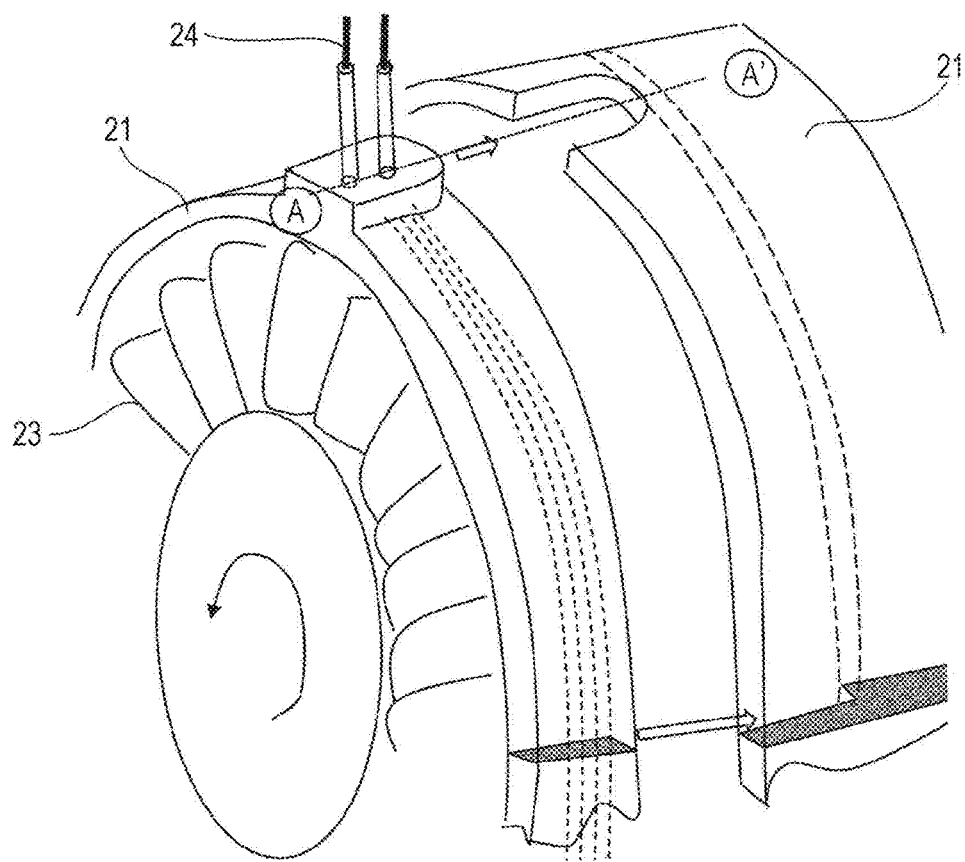

FIG. 38
(a)
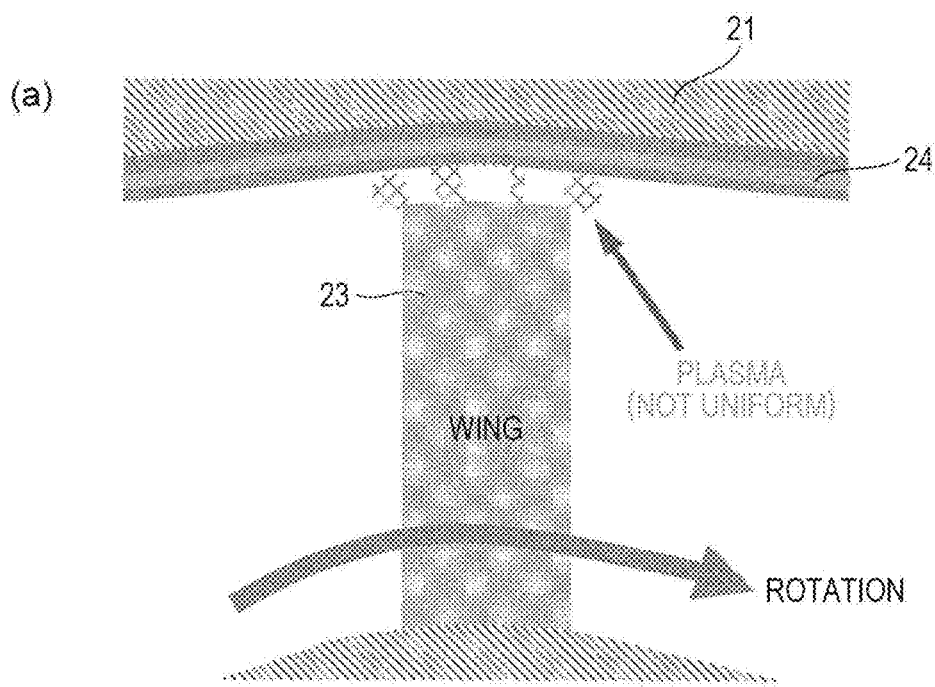
(b)
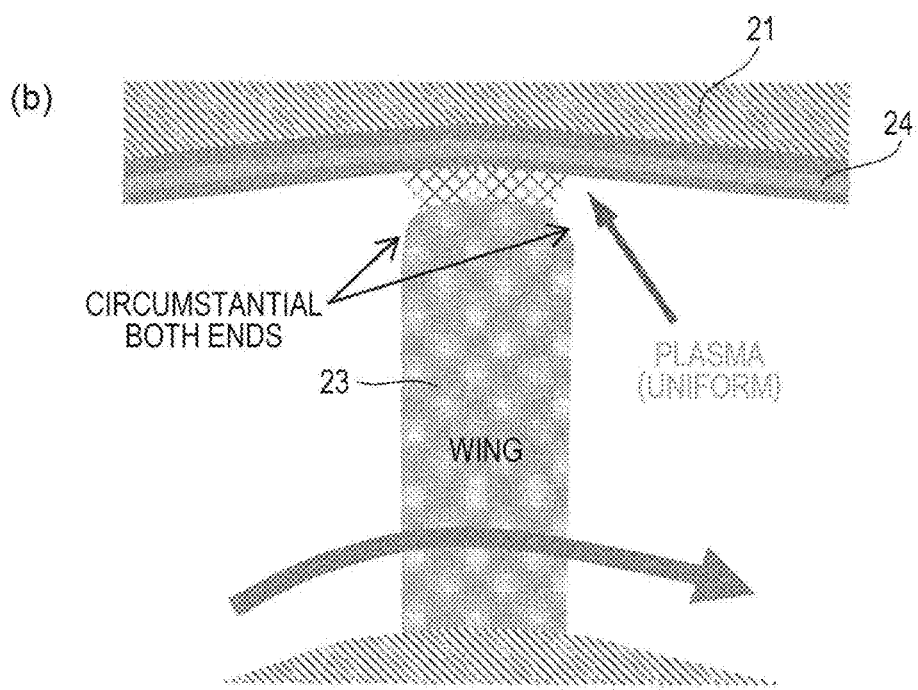

FIG. 40
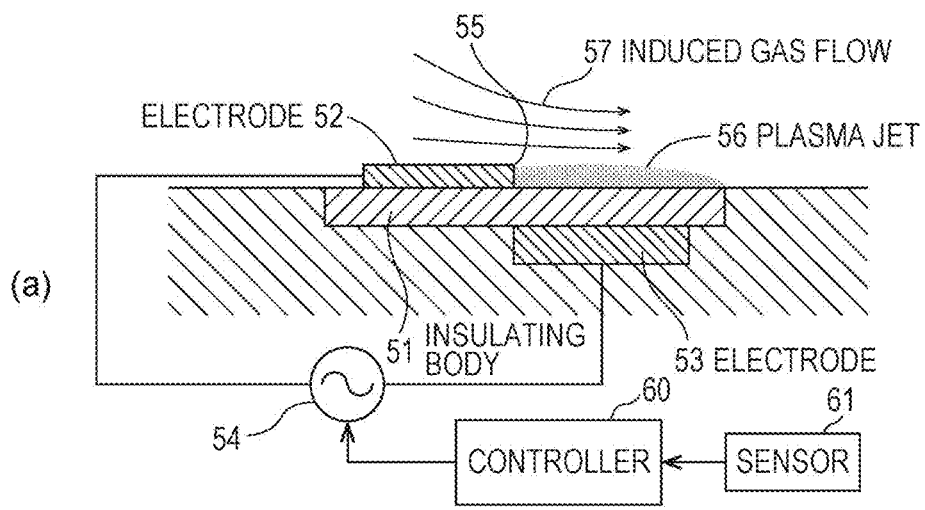
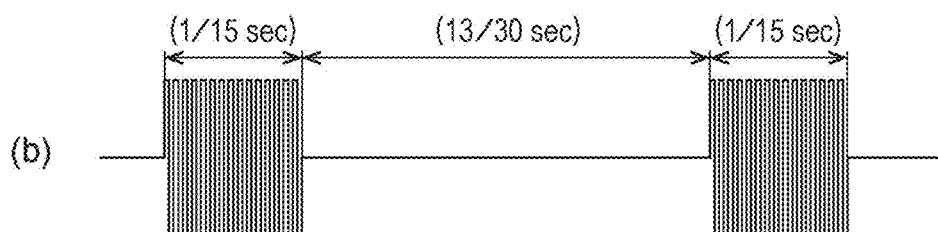
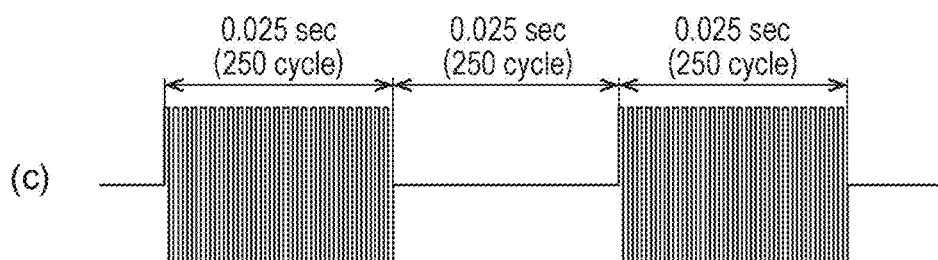
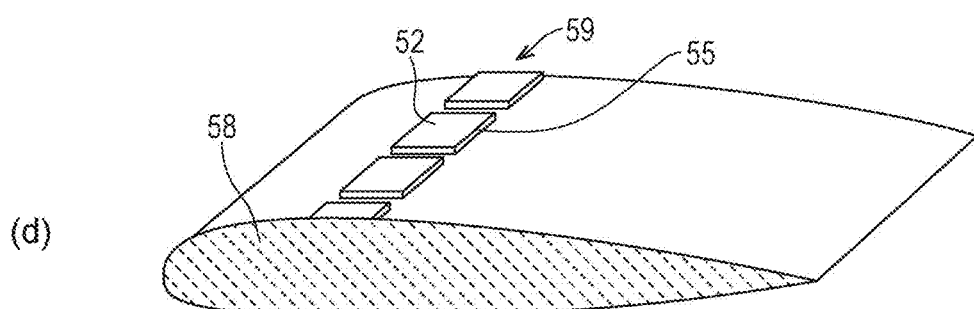

SURFACE PLASMA ACTUATOR

CROSS REFERENCE TO RELATED APPLICATIONS

This application is a U.S. National Phase Application under 35 U.S.C. § 371 of International Patent Application No. PCT/JP2013/067265 filed Jun. 24, 2013, which claims priority to Japanese Patent Application Nos. JP 2012-175614 filed Aug. 8, 2012, JP 2012-197259 filed Sep. 7, 2012 and JP 2012-234105 filed Oct. 23, 2012. The International Application was published on Feb. 13, 2014, as International Publication No. WO 2014/024590 under PCT Article 21(2). The entire contents of these applications are hereby incorporated herein by reference.

TECHNICAL FIELD

The present invention relates to improvement in a surface plasma actuator that includes a front surface electrode and a back surface electrode provided on the respective surfaces of an insulating layer and that generates plasma from the vicinity of the front surface electrode by application of a voltage to both of the electrodes so as to control the flow of gas such as air.

BACKGROUND ART

As such a plasma actuator, a sheet plasma actuator illustrated in FIG. 40 is typically known, for example. In this actuator, a front surface electrode 52 and a back surface electrode 53 are provided on the respective surfaces of a plate insulating body 51, which is made of a resin, a ceramic or the like and serves as a dielectric, such that the insulating body 51 is sandwiched between the front surface electrode 52 and the back surface electrode 53. When the front surface electrode 52 and the back surface electrode 53 are connected to an AC power source 54 and an AC electric field is generated, the plasma actuator generates a plasma jet 56 from an edge 55 of the front surface electrode 52 along the front surface of the insulating body 51.

The thus-generated surface plasma guides the neighboring gas to generate an induced gas flow 57. Accordingly, studies have been made to effectively apply the effects thereof in controlling the lifting power of wings and the like.

According to an exemplary study, as illustrated in FIG. 40(d), a surface plasma generator 59 as described above is provided on a front surface of a wing 58 at a position where the air flow tends to be separated from the wing surface. In the example illustrated in the same drawing, upper electrodes 52 are linearly aligned on the front surface of the wing.

The surface plasma generator 59 in use generates surface plasma from the edges 55 of the front surface electrodes 52 in accordance with the principle described above, and a plasma jet is generated. The generated plasma jet affects the gas flow flowing around the front surface of the wing 58 in accordance with the principle of the induced gas flow generation, and thus can prevent the separation of the gas flow which tends to take place at this position.

In particular, the surface plasma generator, which does not include any mechanical operative portions, is hardly damaged, and thus can be stably operated for a long time.

As described above, the plasma actuator is employed as a device for preventing the separation of the wing surface gas flow. In addition, in view of the characteristics of the plasma actuator, such as a characteristic that no operative portions are included and a characteristic that the plasma actuator is small and light-weight, the plasma actuator has been developed for preventing the separation or turbulence in various apparatus using fluid flow, or as a propulsion source for flight vehicles for flying through outer space.

Particularly as illustrated in FIG. 40(a), in the plasma actuator, the AC power source 54 can be controlled by a controller 60. Further, a sensor 61 detects the gas speed or the temperature. Based on the detection signal, the controller 60 controls the AC power source 94. By this operation, the plasma actuator generates the surface plasma corresponding to the conditions at this time.

According to the example illustrated in FIG. 40(b), at this time, an AC pulse is output as the control signal for $\frac{1}{15}$ second. Then, after the pausing of $\frac{13}{30}$ second, the same AC pulse is output. By conducting a duty ratio control to increase the pulse supply time as illustrated in FIG. 40(c), a stronger plasma jet is generated and a faster induced gas flow is generated around the plasma jet.

Patent Literature 1 discloses a technique to stably generate surface plasma of high speed by suitably setting the rising steed of a voltage applied to electrodes of a plasma actuator. Patent Literature 2 discloses a plasma actuator stably operable even under high temperature environment. Patent Literature 3 discloses a technique to apply a plasma actuator to an ozone generator. Patent Literature 4 discloses a technique to apply a plasma actuator to an anti-icing device.

In addition, Patent Literature 5 mentioned below discloses that the generation of a noise gas flow is reduced by accommodating primary components of a pantograph in a collector shoe shaped like a hollow box. Further, Patent Literature 6 mentioned below discloses that the generation of a noise gas flow is reduced by covering an arm of a pantograph with a cover.

Patent Literature 7 mentioned below discloses that a blade is protected from high temperature by injecting compressed air from an end of a turbine blade toward a tip clearance, and that the optimum tip clearance is maintained by providing a plate configured to reduce a tip clearance vortex.

Non-Patent Literature 1 mentioned below discloses the effects obtained by providing a plasma actuator to a distal end of a turbine blade lattice, by means of visualizing the flow within the tip clearance and measuring the pressure at the outlet of the blade lattice. According to this literature, the plasma actuator suppresses the generation of leakage vortex and reduces the loss by 9% at maximum.

CITATION LIST

Patent Literatures

PATENT LITERATURE 1: JP-A-2010-61919
PATENT LITERATURE 2: JP-A-2008-270110
PATENT LITERATURE 3: JP-A-2009-242172
PATENT LITERATURE 4: JP-A-2008-159336
PATENT LITERATURE 5: Japanese Patent No. 3297355
PATENT LITERATURE 6: Japanese Patent No. 4271004
PATENT LITERATURE 7: Japanese Patent No. 4178545

Non-Patent Literature

NON-PATENT LITERATURE 1: Proceeding of ASME Turbo Expo 2008 (July 9 through 13): Power for Land, Sea and Air GT2008-50703 (Daniel K. Van Ness II et al.)

SUMMARY OF THE INVENTION

Problems to be Solved by the Invention

As described above, the sheet plasma actuator, in which the plate-shaped upper electrode 52 and the plate-shaped lower electrode 53 are provided to sandwich the plate-shaped insulator 51 therebetween, has adequate rigidity with three plates layered on one another. Therefore, when such a sheet plasma actuator is applied to a three dimensional curved surface such as a turbine blade of a gas turbine or a windmill, folds or unevenness is generated by twist, which may lead to a turbulence of gas flow. Accordingly, the desired effect of the plasma actuator cannot be obtained.

In addition, the three plates layered on one another occupy certain thickness and area, and thus may affect the high speed flow at a large area. This may cause the air resistance against the gas flow flowing around the wing front surface, and may lead to a turbulence of the gas flow. Thus, the sheet plasma actuator may be peeled off.

In order to solve the above problem, by cutting out only the neighborhood of the electrodes of the sheet plasma actuator, and attaching the same only to desired positions, the sheet plasma actuator can be applied to a three dimensional surface while avoiding the generation of folds or unevenness to some extent.

However, when the distance between the front surface electrode and the back surface electrode is not sufficiently maintained, short circuit may be caused due to creeping discharge. Therefore, while the insulating layer needs to be kept as wide as possible, the shortest distance between the electrodes needs to be kept as great as possible.

Even when the plasma actuator is used in typical dry air, i.e., in an environment where a short circuit is not likely to be caused, a short circuit may be caused easily particularly if the air is mixed with water drops or charged particles. Since ions are generated from the plasma actuator itself, a path to the back surface electrode may be created due to creeping discharge and cause a short circuit.

Further, when a casing upon which the sheet plasma actuator is disposed is made of an insulating material, the safety is secured by grounding the front surface electrode and applying the higher voltage onto the back surface electrode. At this time, in order to prevent the above creeping discharge, the casing needs to be covered with an insulating layer as much as possible. As a result, the weight of the sheet plasma actuator is increased.

When the casing upon which the sheet plasma actuator is disposed is made of a conductive material, i.e., the grounding casing is made of a conductive material (metal), the arc problem takes place more easily. When a high-voltage high-frequency signal is input onto the front surface electrode while the back surface electrode is grounded, the risk of short circuit is greatly increased due to charged particles and water drops (rain) unless the surface is covered with an insulating layer.

By grounding the front surface electrode and the casing, the safety is improved to some degree. However, the back surface electrode is required to be reliably kept insulated from the casing. Accordingly, an additional insulating layer is required to interpose between the casing and the back surface electrode. This insulating layer is required to be thickened in accordance with the required insulation. The weight is accordingly increased, and the adverse effect thereof on the gas flow is further increased.

In addition, when the casing is made of a conductive material, the entirety of the casing is grounded. Therefore, it becomes difficult to induce the plasma only from one side of the front surface electrode. Thus, further improvement is necessary for the inducement of a unidirectional jet flow. Besides, since the back surface electrode is positioned closely to the casing, the electric capacitance is increased even in wiring portions where no plasma is generated.

In order to prevent the short circuit from the back surface electrode, the surface of the sheet plasma actuator needs to be strongly attached and sealed to the casing. At this time, wiring to supply power to the sheet plasma actuator is required, and the insulating of the end surfaces at that position is also required.

Furthermore, by applying the plasma actuator to a heat exchanger or the like, the heat transmissibility is enhanced due to the prevention of the separation and the acceleration of the fluid mixture (acceleration of turbulent flow). However, by attaching the sheet plasma actuator to the heat exchanger, the heat exchange portion may be covered with the sheet plasma actuator, which deteriorates the heat exchange efficiency. Therefore, the application of the sheet plasma actuator may conversely deteriorate the performance of the heat exchanger.

The application of the sheet plasma actuator to a blade of a gas turbine may also become a hindrance to a cooler mechanism of the turbine and the like. In addition, the attachment of the sheet plasma actuator to the blade may change the shape of the blade, which is not favorable.

In order to flush mount the sheet plasma actuator by providing the casing with a recess or by other method for preventing such a problem, the front surface electrode requires wiring on its back side. Such wiring may lead to a local generation of turbulence.

When the sheet plasma actuator is attached to the entire wing surface, by covering the entire casing forming the wing with the sheet, the safety against the short circuit is enhanced while the curvature of the wing is maintained. However, the shape thereof is changed due to the sheet thickness. Further, even when the sheet plasma actuator is locally damaged, the entire sheet needs to be replaced. Therefore, it is not practically feasible to attach the sheet to the entire blade.

On the other hand, in an automobile having a stepped portion that is stepped down vertically with respect to the air flow generated during the travelling of the automobile, such as a truck having a cab whose back end is formed as a vertical wall, the air flow is separated from the stepped portion at a rear position. A low speed area is formed at a rear surface of the stepped portion, and a low pressure region where the pressure is lower than the stagnation point pressure of the automobile front side is formed.

The pressure difference generates a pressure drag (or a form drag) on the vehicle body, and the fuel efficiency is deteriorated.

Further, on the rear side of the stepped portion, a vibration flow of a large scale is generated. Such vibration flow, which may cause the vehicle body to wobble, not only adversely affects the stable travelling of the automobile, but also deteriorates the fuel efficiency like the pressure drag because such vibration flow generates a drag (induced drag) due to the vortex generation.

Accordingly, in order to effectively enhance the aerodynamic characteristics and environmental characteristics of the vehicle body, the low pressure region formed at the rear face of the stepped portion needs to be reduced, and the downstream vibration needs to be suppressed.

In order to realize the above, the plasma actuator is prominently effective. However, for reducing the low speed region and the vibration flow, the jet needs to be introduced in the flowing direction or the vertical direction near an electrode of the stepped portion. The plasma actuator needs to be disposed at the stepped portion, i.e., a rear end corner of a cab top plate in case of a truck.

Accordingly, the sheet plasma actuator needs to be bent to be attached to the rear end corner of the cab top plate. Therefore, the plate-shaped insulating body may be damaged to generate a dielectric breakdown. In addition, the insulating body may be easily damaged due to the vibration during the travelling.

In a current collector (pantograph) of a rapid train, the air flow is separated at the rear side of the collector shoe and a columnar arm configured to raise the collector shoe to bring the collector shoe into contact with the overhead wire, and the vibration flow and Karman vortex are generated. This phenomenon becomes more prominent when the train travels more rapidly, and the noise is increased. Accordingly, if the vibration flow and the Karman vortex are suppressed, the noise is greatly reducible.

With the above background, an object of the present invention is to enable a plasma actuator to be easily mounted to a three dimensional wing shape such as a wind power generator, aircraft and gas turbine, an outer wall of an automobile such as a truck, and a pantograph of a rapid train, and also to enhance aerodynamic characteristics and energy efficiency and prominently expand the utility of the plasma actuator by enabling the plasma actuator to be disposed exactly at the optimum position without causing folds or the like while minimizing the attaching area.

Solutions to the Problems

To solve the above problems, a surface plasma actuator according to an aspect of the invention includes the following technical features.

(1) A conducting wire and an electrode made of a conductive thin film or thin plate are attached to a surface of a target object made of an insulating material while the conducting wire and the electrode are opposed to each other. Surface plasma is generated along a neighborhood of the conducting wire by applying a pulse voltage between the conducting wire and the electrode, and an induced gas flow is generated by the surface plasma.

(2) An insulation coated conductor including a conducting wire coated with an insulating film is attached to a surface of a target object made of a conductive material. Surface plasma is generated along a neighborhood of the insulation coated conductor by applying a pulse voltage between the target object and the conducting wire, and an induced gas flow is generated by the surface plasma.

Advantageous Effects of the Invention

According to the aspect of the invention, the following advantageous effects are obtained.

(1) According to the aspect of the invention, the conducting wire coated with the insulating film is used as the material for the plasma actuator to provide a wire plasma actuator. As compared to a known sheet plasma actuator, the wire plasma actuator is highly flexible in terms of the attaching position. Thus, the wire plasma actuator is easily attached even to casings of various three dimensional shapes.

(2) When the casing to which the wire plasma actuator is attached is made of a metal, the casing itself serves as an electrode to be grounded, and thus the safety is secured.

Further, the electrode to which the high voltage is applied is coated with the insulating film in advance. Accordingly, the risk of short circuit is prominently reduced.

(3) By applying a conductive coating partially to the exterior of the conducting wire coated with the insulating film, or by applying thereto an insulating thin film configured to hinder the plasma generation, a unidirectional flow is generated.

(4) By using the conducting wire not coated with the insulating film as the front surface electrode separately from the casing, a jet stream is induced at various positions within a three dimensional space, which is applicable to the insulation casing.

For instance, when a flow is desirably induced only at a single portion, the dielectric barrier discharge can be generated by minimizing the distance between the conducting wire coated with the insulating film and the conducting wire not coated with the insulating film.

On the other hand, when the inducement of the dielectric barrier discharge and the flow is not desirable, such problem can be solved by increasing the distance between the conducting wires. In addition, since the electrostatic capacity is resultantly reduced, the driving power of the plasma actuator is reduced.

(5) At an end surface where the conducting wire serving as the electrode to be applied with the high voltage is exposed, a short circuit may be caused. Accordingly, the end surface needs to be insulated. For instance, by applying thereto silicon rubber, insulation coating or resist, the short circuit can be reliably prevented at low cost.

In a known two dimensional sheet plasma actuator, the end surface corresponds to the length of a cut edge. On the other hand, in the wire plasma actuator according to the aspect of the invention, the area to be insulated is only the cross-sectional area of the conducting wire and the insulating film, which is much smaller than the area in the sheet plasma actuator.

(6) When the electrode is embedded so as to be flush-mounted, the conductive wire coated with the insulating film, which has a small cross-sectional area, can be easily attached to the casing by providing the casing with a minimum necessary recess. Further, even when the conducting wire is damaged, the replacement is easy. Thus, further cost reduction is made possible.

BRIEF DESCRIPTION OF THE DRAWINGS

FIG. 11 shows a modification of Example 2, according to which the insulation coated conductor is directly attached to the conductive metal casing.

FIG. 12 shows a configuration of Example 3, according to which the position of an insulation coated conductor is controlled.

FIG. 13 shows a configuration of Example 4, according to which the movements of plural insulation coated conductors are controlled.

FIG. 14 compiles the merits and demerits of conductive materials used for conducting wire.

FIG. 15 compiles the merits and demerits of insulating materials used for insulation coating.

FIG. 29 is an enlarged view showing a primary portion of the gas turbine to which the wire plasma actuator is applied.

FIG. 31 shows a unit example in which an insulation coated conductor is embedded into the inside of an insulation guide made of fine ceramics.

FIG. 38 shows an example where an induced flow generated between an insulation coated conductor and an outer peripheral end of a turbine blade is non-uniform.

FIG. 40 is a diagram for describing a known plasma actuator.

DESCRIPTION OF EMBODIMENTS

In the following, examples of the present invention will be described with reference to the attached drawings.

EXAMPLES

Example 1

Applied to Insulating Material Casing

Figure 1:
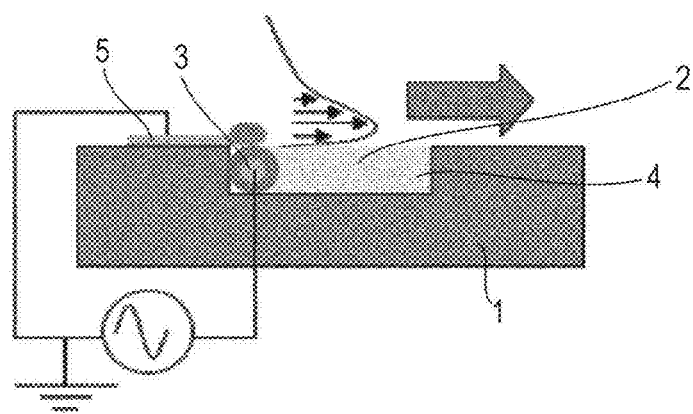
FIG. 1 shows the entire configuration of Example 1, according to which a wire plasma actuator is attached to an insulating material casing.

FIG. 1 shows the entire configuration of Example 1. In this example, a wire plasma actuator according to an aspect of the invention is attached to a casing made of an insulating material, so that an induced gas flow is generated on its surface.

An insulating material casing 1 has a recess 2. In this drawing, an insulation coated conductor 3 exemplarily made of a copper wire coated with Teflon (Registered Trademark) is disposed along a left end of the recess 2. By embedding the insulation coated conductor 3 in the recess 2 with insulating putty 4 or the like, the insulation coated conductor 3 is flush-mounted to form a surface flushed with the periphery surface of the insulating material casing 1. When the casing is made of an insulating material as in this example, the conducting wire does not have to be coated with a insulating film, such as a copper wire coated with Teflon. However, since the conducting wire is applied with a high voltage, the insulation coated conductor 3 is preferably employed if a short circuit is likely to be generated at the time of taking out the conducting wire from the inside or the insulating material casing 1.

On the other hand, a tape electrode 5 formed as a thin film from a conductive metal such as copper is attached to a surface of the insulating material casing 1 that follows the left end edge of the recess 2. A high-voltage high-frequency signal is applied between the tape electrode 5 and the insulation coated conductor 3. Incidentally, the voltage and frequency of such a high-voltage high-frequency signal may be substantially at the same level as employed in a known plasma actuator. In addition, a known technique may be applied to the applying time and the duty ratio control.

In this example, the tape electrode formed as a thin film is used. When the position thereof is kept constant with respect to the insulation coated conductor 3, the width of the tape electrode may be reduced to the minimum and a linearly-shaped thin film electrode may serve as the tape electrode.

Figure 2:
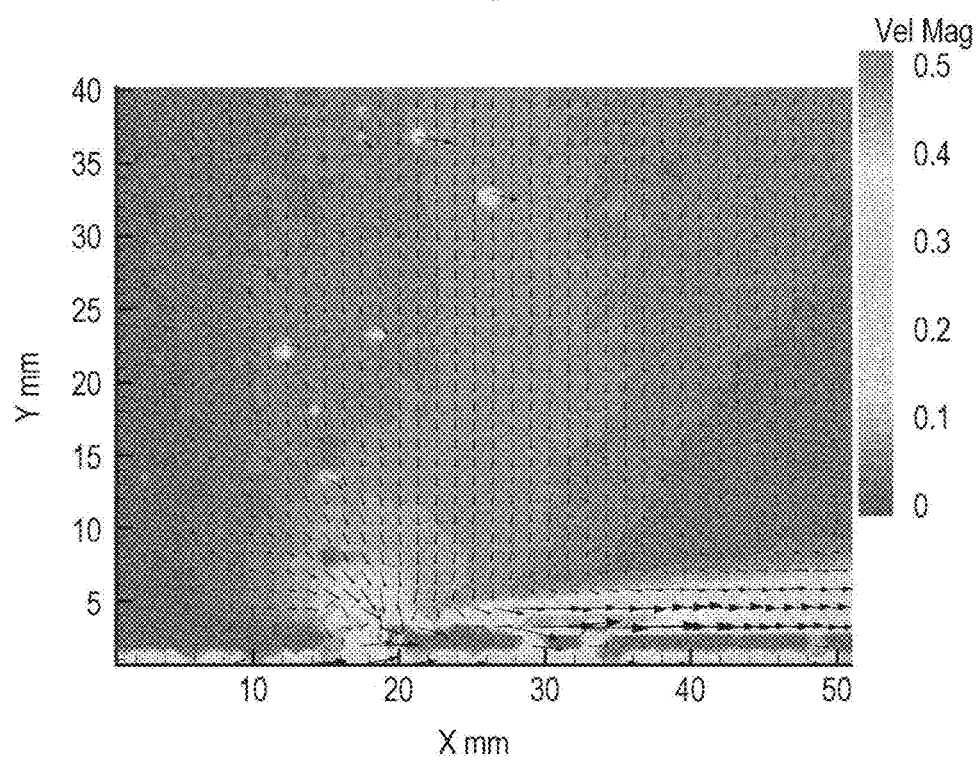
FIG. 2 shows experimental results of an induced gas flow generated by Example 1.

According to this configuration, as indicated by the actual measurement results shown in FIG. 2, it has been observed through the experiment that a plasma discharge is generated between the insulation coated conductor 3 and the tape electrode 5, and that a strong induced gas flow is generated by surface plasma to flow rightward (the direction indicated by arrow in FIG. 1), in other words, toward the right side from the left end of the recess 2 in the insulating material casing 1 where the insulation coated conductor 3 is located.

Figure 3:
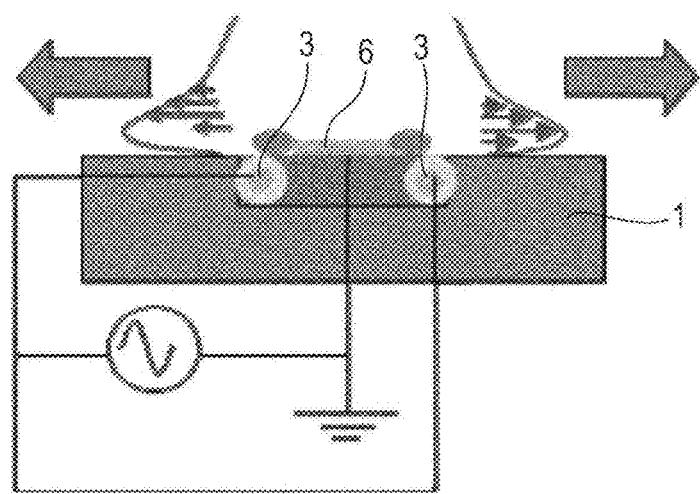
FIG. 3 shows a modification of Example 1, according to which insulation coated conductors are disposed at right and left ends of a recess.

As illustrated in FIG. 3, the insulation coated conductor 3 may be embedded in each of the right and left ends of the recess 2 formed in the insulating material casing 1 and flush-mounted with use of the insulating putty 4 to form a surface flushed with the periphery surface of the insulating material casing 1. Then, a sheet electrode 6 formed as a thin plate from a conductive metal such as copper may be attached to the surface of the insulating putty 4 so that the sheet electrode 6 reaches the neighborhood of the inner end of each insulation coated conductor 3.

According to this configuration, when the high-voltage high-frequency signal is applied between the right and left insulation coated conductors 3 and the sheet electrode 6, the surface plasma generates an induced gas flow on the right and left sides.

Figure 4:
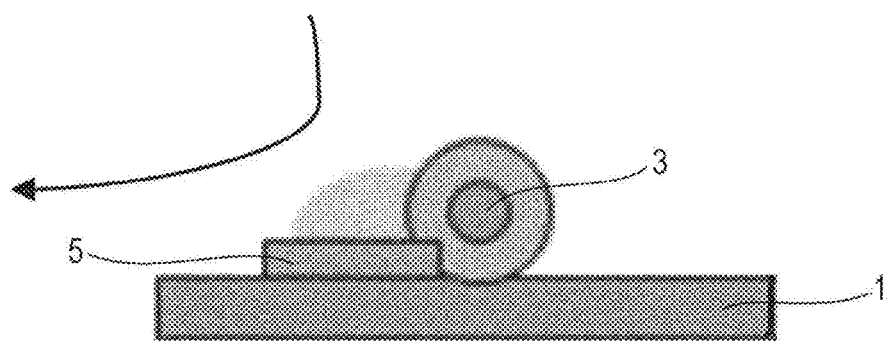
FIG. 4 shows a modification of Example 1, according to which an insulation coated conductor and a tape electrode are directly attached.
Figure 5:
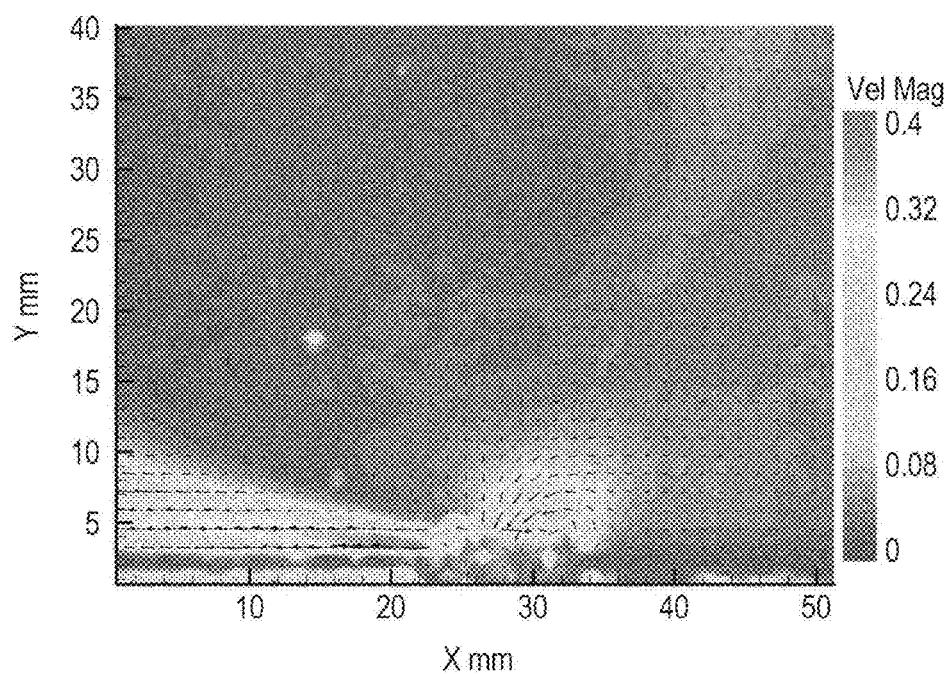
FIG. 5 shows experimental results of an induced gas flow generated by the modification.

In particular, when the aerodynamic characteristics of the surface of the insulating material casing 1 are not greatly affected, the insulating material casing 1 may dispense with the recess 2. As illustrated in FIG. 4, the insulation coated conductor 3 may be directly attached to the insulating material casing 1 while the tape electrode 5 may be attached to the insulation coated conductor 3 to contact the left lower end of the insulation coated conductor 3. In this configuration, the leftward induced gas flow can be generated by planar plasma as illustrated in FIG. 5. At this time, the change of the aerodynamic characteristics of the insulating material casing 1 can be kept at minimum by using the insulation coated conductor 3 and the tape electrode 5 that include less irregularities, and by smoothing the stepped portion stepped from the surface with use of the insulating putty 4.

Figure 6:
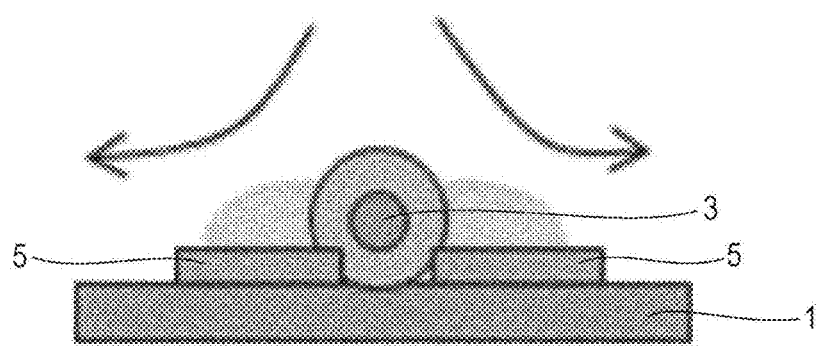
FIG. 6 shows a modification of Example 1, according to which tape electrodes are directly attached at right and left sides of an insulation coated conductor.
Figure 7:
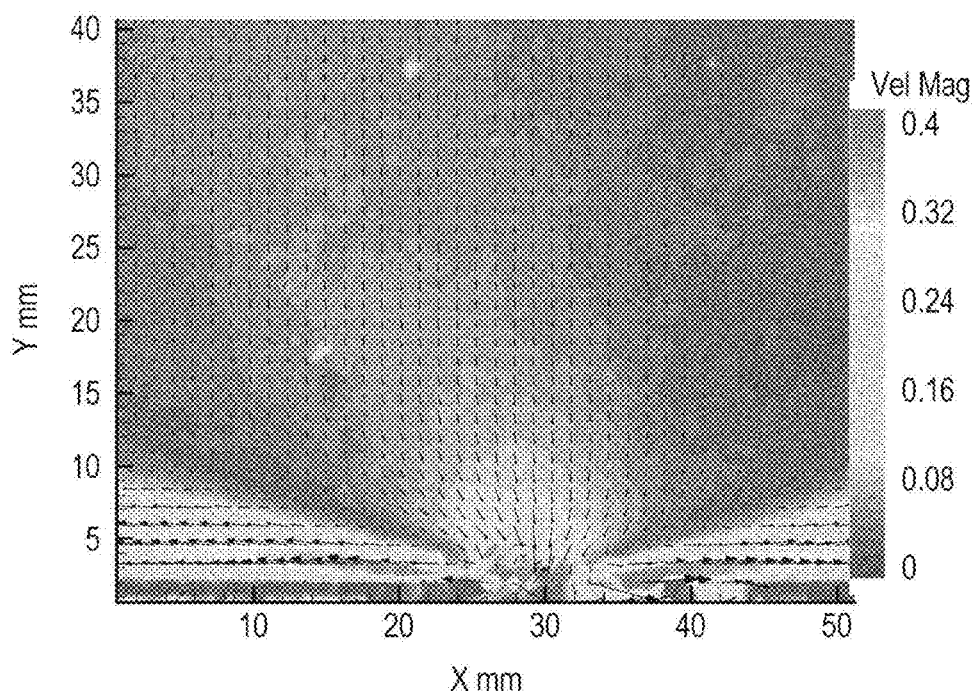
FIG. 7 shows experimental results of an induced gas flow generated by the modification.

Further, when the insulation coated conductor 3 is directly attached to the insulating material casing 1 while two tape electrodes 5 are attached to contact the right and left lower ends of the insulation coated conductor 3 as illustrated in FIG. 6, the rightward and leftward induced gas flows can be generated by the plasma as illustrated in FIG. 7.

Example 2

Applied to Conductive Metal Casing

Figure 8:
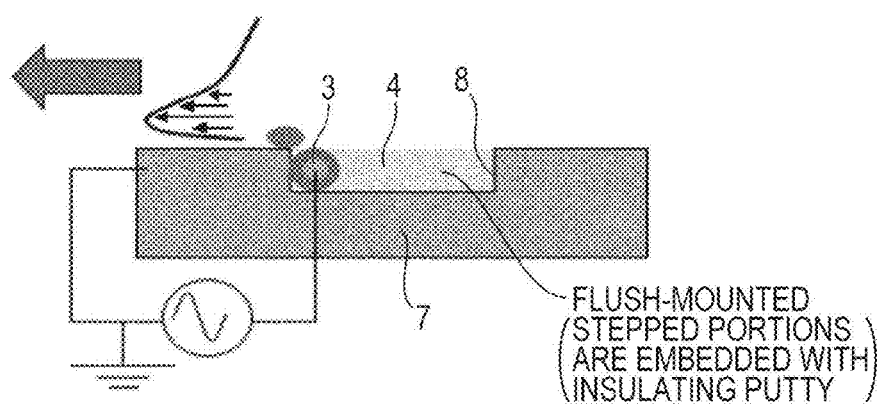
FIG. 8 shows the entire configuration of Example 2, according to which a wire plasma actuator is attached to a conductive metal casing.

FIG. 8 shows the entire configuration of Example 2. According to this example, by attaching the wire plasma actuator according to the aspect of the invention to a casing made of a conductive metal, an induced gas flow is generated on the surface of the casing.

In the example described herein, the recess 8 is formed on a conductive metal casing 7. The insulation coated conductor 3 made of copper wire coated with, for instance, Teflon is disposed to follow the left end of the recess 8. By embedding the insulation coated conductor 3 in the recess with use of the putty 4 or the like, the insulation coated conductor 3 is flush-mounted to the conductive metal casing to form a surface flushed with the surface of the conductive metal casing near the recess.

Figure 9:
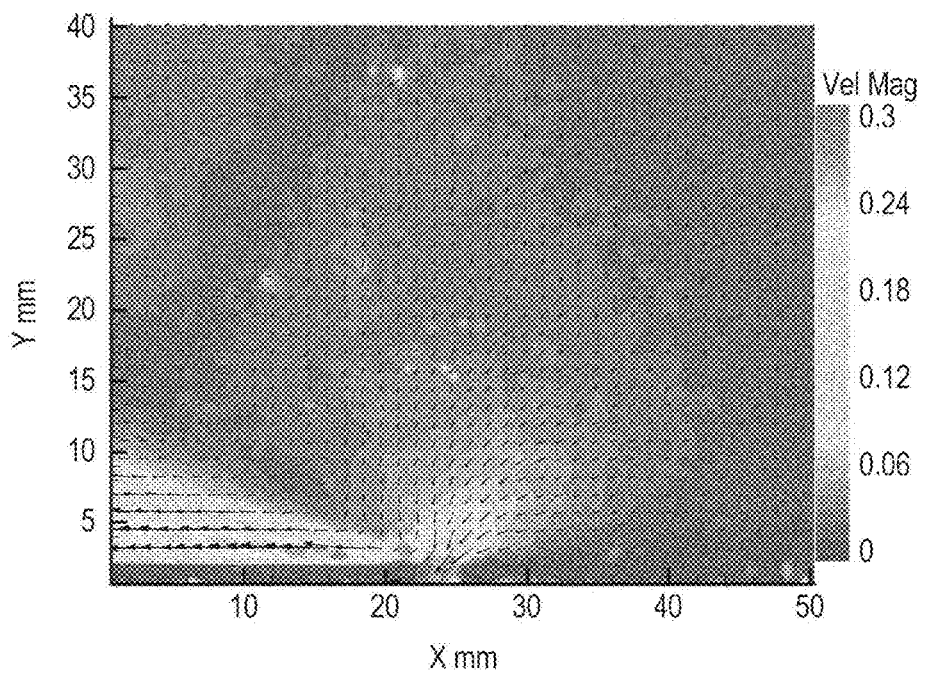
FIG. 9 shows experimental results of an induced gas flow generated by Example 2.

It has been observed through the experiment that, when the high-voltage high-frequency signal is applied between the conductive metal casing 7 connected to the grounded side and the conducting wire of the insulation coated conductor 3, a plasma discharge is generated between the insulation coated conductor 3 and the surface of the conductive metal casing 7 on the left side of the recess via the insulating film as illustrated in FIG. 8 and also that an induced gas flow is generated by the surface plasma to flow leftward from the left side of the recess 8 of the conductive metal casing 7 as illustrated in FIG. 9.

Incidentally, at this time, the voltage and frequency of the high-voltage high-frequency signal may be substantially at the same level as employed in a known plasma actuator may also be employed. In addition, a known technique may be applied to the applying time and the duty ratio control.

Figure 10:
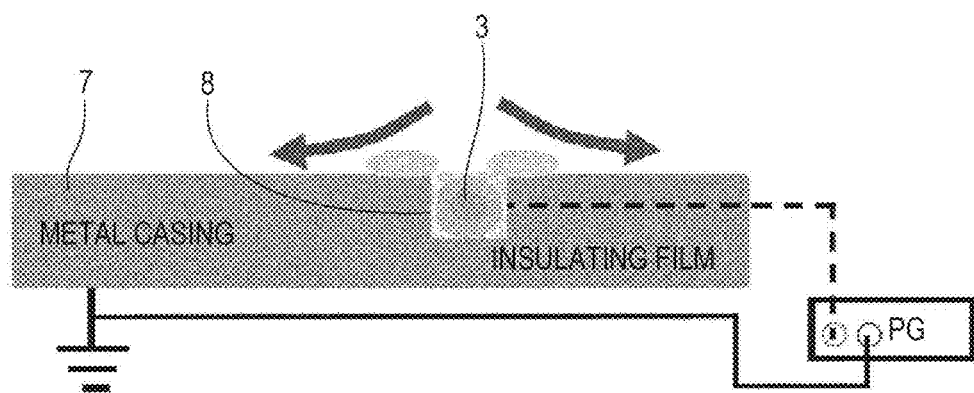
FIG. 10 shows a modification of Example 2, according to which the diameter of a recess provided to the conductive metal casing is made substantially equal to the diameter of an insulation coated conductor.

When the recess 8 formed on the conductive metal casing 7 is formed to substantially correspond to the diameter of the insulating material casing 1, the induced gas flow is generated by the surface plasma from each side as illustrated in FIG. 10.

In addition to the above, without forming the recess 8 on the conductive metal casing 7, the insulation coated conductor 3 may be directly attached to the surface of the conductive metal casing 7. As illustrated in FIG. 11, a high-pressure input conductor 11 may be inserted into a glass tube or a ceramic tube 9 for insulation coating while maintaining a position closer to the conductive metal casing 7.

Example 3

Position Control on Surface of Conductive Metal Casing

According to this example, the position of the insulation coated conductor 3 is controlled while the insulation coated conductor 3 is in contact with the surface of the conductive metal casing 7.

The insulation coated conductor 3 is supported by rails or the like attached to the metal casing such that both ends of the insulation coated conductor 3 are slidable on the rails or the like. As illustrated in FIG. 12, the insulation coated conductor 3 is movable rightward and leftward while the insulation coated outer surface of the insulation coated conductor 3 is kept in contact with the surface of the metal casing.

By applying the high-voltage high-frequency signal between the conducting wire of the insulation coated conductor 3 and the metal casing, an induced gas flow is generated from each side of the insulation coated conductor 3 by the surface plasma. By adjusting the position of the insulation coated conductor 3 in the right and left direction, the insulation coated conductor 3 may be positioned, manually or with use of an electric motor or the like such as a linear motor, at the optimum position corresponding to the direction and speed of the air flow made on the surface of the metal casing. When this configuration is applied to the insulating material casing, a unit in which the tape electrode 5 is integrally attached to a lower end of the insulation coated conductor 3 is attached to the insulating material casing in a manner movable rightward and leftward.

Example 4

Movement of Plural Insulation Coated Conductors

As illustrated in FIG. 13, according to this example, a plurality of insulation coated conductors 3 is disposed to be in contact with the surface of the metal casing. By moving each insulation coated conductor 3 while the high-voltage high-frequency signal is being applied between the insulation coated conductors 3 and the metal casing, the surface plasma is generated from the upper side toward both sides of each insulation coated conductor 3. As illustrated in FIG. 13, each induced gas flow flows from each opposing side of a neighboring pair of the insulation coated conductors 3 toward the center between the neighboring insulation coated conductors 3, and collides with each other to ascend.

When each insulation coated conductor 3 is moved in the same direction at the same speed, the direction of the induced gas flow generated on the surface of the metal casing is shifted every t0 to δt as illustrated in FIG. 13.

For instance, with respect to a flow within a rectangular or circular duct such as a flow duct (i.e., channel flow surrounded by flat panels), it is a widely known attempt to reduce the friction resistance between the fluid and the inner surface of the duct for the prevention of the reduction in the fluid speed, and such attempt is a key for improving the energy efficiency.

To solve such a problem, a known technique prepares computational models with use of the method of computational fluid dynamics (CFD), obtains the pressure distribution of the flow on the duct surface and the periphery thereof, and simulates the ideal distribution thereof.

By applying this example to such a duct, the ideal distribution which has been difficult to realize becomes feasible by minimizing the influence given to the flow within the duct is minimized, by obtaining the ideal distribution of the flow on the duct surface and the periphery thereof based on the shape, size, bending section, merging section and branching section of the duct as well as the type and speed of the fluid, in accordance with the method of the computational fluid dynamics, and by setting the position, upstream or downstream movement direction and movement speed of the plural insulation coated conductors 3.

(Selection of Material for Conducting Wire and Insulating Film)

The insulation coated conductor 3 for use in the examples described above includes a conducting wire material and an insulating film material configured to coat the conducting wire material. Various materials may be combined for these materials.

Representative examples of the metal material preferably for use as the conducting wire material are as listed in the table of FIG. 14.

The conducting wire material and the insulating film material need to be selected suitably in view of the characteristics of such materials, the cost effectiveness, and the circumstantial factors such as temperatures and impacts.

As the conducting wire material, copper, for instance, is a low-cost material that has a low resistivity and favorable conductivity. In addition, when the insulating material is a flexible material such as polymer, copper may be formed into a double side copper clad plate by rolling. Thus, copper is advantageous in that copper can provide a plasma actuator whose both sides are etchable. Further, when the plasma actuator is in use under low temperature environment, the plasma actuator may be connected with the power supply cable by soldering.

On the other hand, platinum and gold, which exhibit low resistivity, are ideal materials for generating further stronger surface plasma while reducing the power consumption. However, these metals are not only quite expensive, but also unfavorable in terms of their durability. Accordingly, these materials may be effectively plated or vapor deposited over the surface of the base material made of, for example, copper.

Representative examples of the metal material preferably for use as the insulating film material are as listed in the table of FIG. 15.

In particular, polyimide, which is used in electronic circuit boards, exhibits prominently high reliability and high durability in high temperature environment. In addition, a quartz glass tube having an inner diameter of 20 μm to 2500 μm is developed. Such a quartz glass tube is formed such that the interior and the exterior of the hollow are coated with the insulating resin such as polyimide and acryl. By inserting the conducting wire into the hollow, the insulation coated conductor can be formed. Quartz glass, whose melting point is 1700° C. or higher, can be used in a combustion chamber of a gas turbine. In addition, by connecting one opening end of the quartz tube to a ventilator such that cooling air is circulated within the quartz tube and thereafter exhausted through the other opening end of the quartz tube, the temperature of the quartz tube can be controlled to be constant, and the quartz tube can be used in higher temperature environment.

A sapphire glass tube is more expensive than the quartz tube. However, the sapphire glass tube, which has a high bending strength as well as flexibility to some extent, and also has heat resistance for heat of 1700° C. or more, is applicable to various apparatus including a combustor of a gas turbine that requires the tube to be attached to a curved surface.

In addition to the above, the insulating film material needs to be selected in consideration of the adhesiveness to a target object, the workability with the conducting wire, and the connectivity of the conducting wire with the power supply cable. Alternatively, the insulating film material may be formed into a flexible sheet, and a plurality of conducting wires disposed to form a predetermined pattern may be effectively sandwiched between such insulating film material sheets.

In the following, specific examples in which the wire plasma actuators according to the aspect of the invention described in Examples 1 to 4 are applied will be described.

Example 5

Application 1 to Wing

Figure 16:
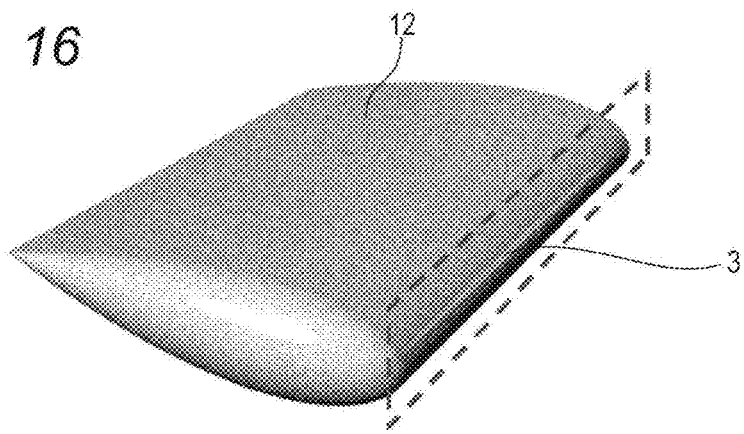
FIG. 16 shows a configuration of Example 5, according to which a wire plasma actuator is applied to a conductive wing.
Figure 17:
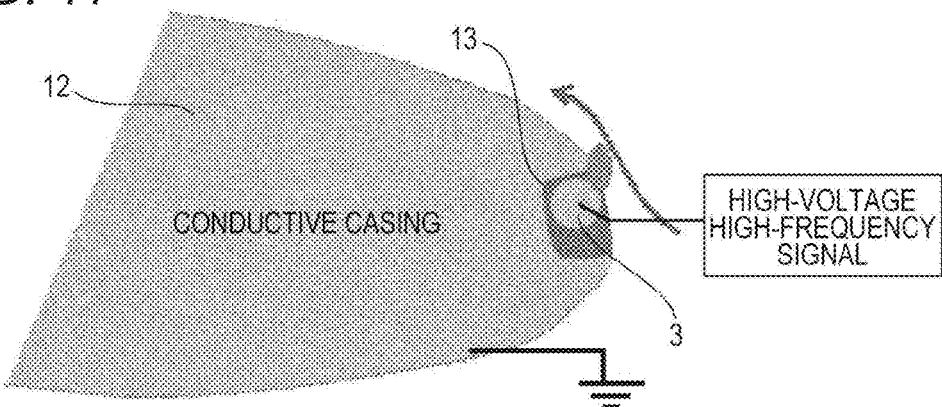
FIG. 17 is a cross-sectional view of Example 5, according to which a wire plasma actuator is applied to the conductive wing.

Example 5 is an example where the wire plasma actuator according to the aspect of the invention is applied to a wing 12 made of a conductive casing. FIGS. 16 and 17 show an example where the wire plasma actuator according to the aspect of the invention is disposed at a front end of the wing to extend in the width direction.

Since the wing 12 is made of a conductive metal such as duralumin, Example 2 is applied to the wing 12. In this example, the recess 13 is formed at the front end of the wing to extend in the width direction.

As illustrated in FIG. 17, when the wing 12 is seen from the lateral side, the insulation coated conductor 3 is disposed along the upper end of the recess 13. The insulation coated conductor 3 is embedded in the recess with the insulating putty or the like to be flush-mounted to conform to the design shape of the wing front end.

Figure 18:
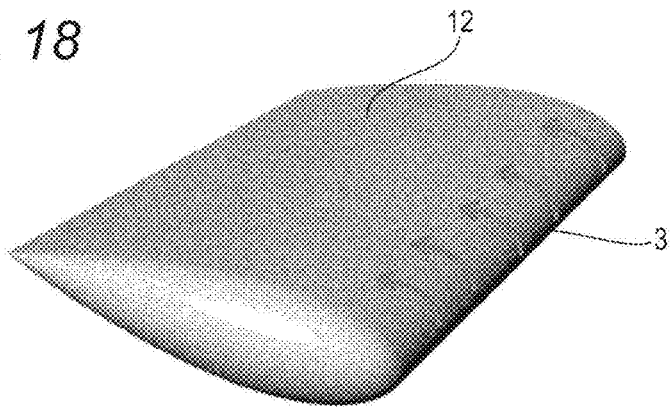
FIG. 18 shows a modification of Example 5, according to which a wire plasma actuator is applied to the conductive wing.
Figure 19:
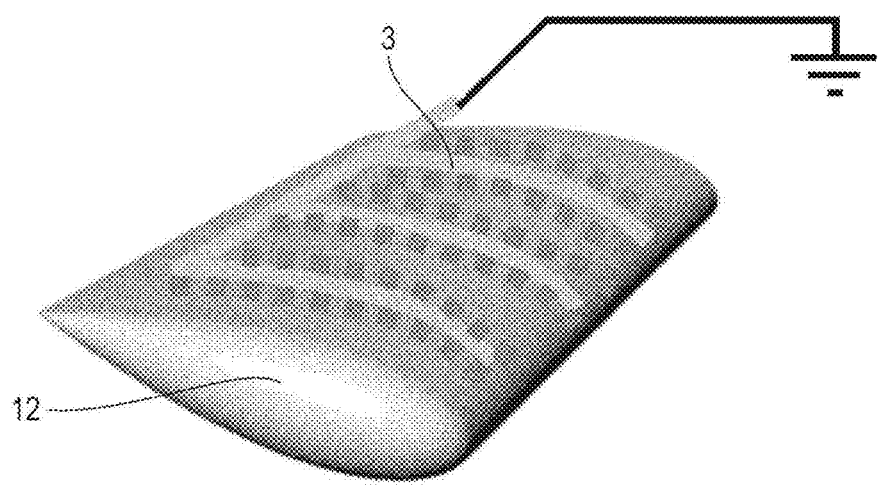
FIG. 19 shows a configuration example of Example 6, according to which a wire plasma actuator is applied to a conductive wing.

As illustrated in FIG. 18, when the high-voltage high-frequency signal is applied between the insulation coated conductor 3 and the wing 12, an induced gas flow is generated by the surface plasma to flow from the wing 12 along the upper surface of the wing 12. Thus, the separation of the gas flow can be prevented, and the lifting power can be stably controlled. The high-voltage high-frequency signal is applied to one end of the conducting wire of the insulation coated conductor 3. The other end of the insulation coated conductor 3 is grounded via the wing 12 made of the conductive casing. Although the high-voltage high-frequency signal generator is located at a position outside of the wing 12 in the drawing, the high-voltage high-frequency signal generator is disposed within the wing 12 or within the machine in the actual configuration.

Example 6

Application 2 to Wing

Example 6 is an example where an induced gas flow is generated from each side of the wing 12 made of an insulating material in a span direction. In this example, a zigzag groove is formed in the surface of the wing 12 as indicated by a chain line 19.

Figure 20:
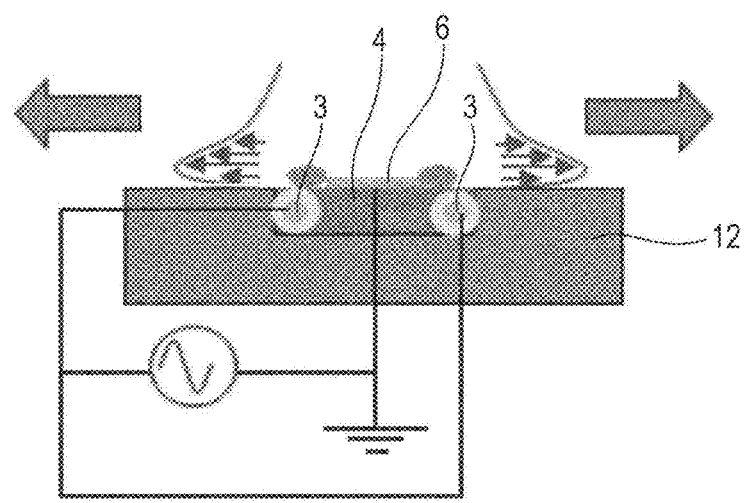
FIG. 20 shows a modification of Example 6, according to which a wire plasma actuator is applied to a wing made of an insulating material.

FIG. 20 shows a cross section of one groove taken in the span direction. Two insulation coated conductors 3 are inserted in the groove and positioned along each widthwise end of the groove. The insulation coated conductors 3 are fixed and flush-mounted with use of the insulating putty 4.

Similarly in FIG. 3 of Example 1, the sheet electrode 6 made of a conductive metal such as copper is attached onto the surface of the insulating putty 4 so that the sheet electrode 6 reaches the neighborhood of the inner end of each insulation coated conductor 3.

With the above configuration, by applying the high-voltage high-frequency signal between the conducting wire of each insulation coated conductor 3 and the sheet electrode 6, an induced gas flow is generated by the surface plasma on the right and left sides in the span direction.

Example 7

Application to Stepped Portion of Automobile

Figure 21:
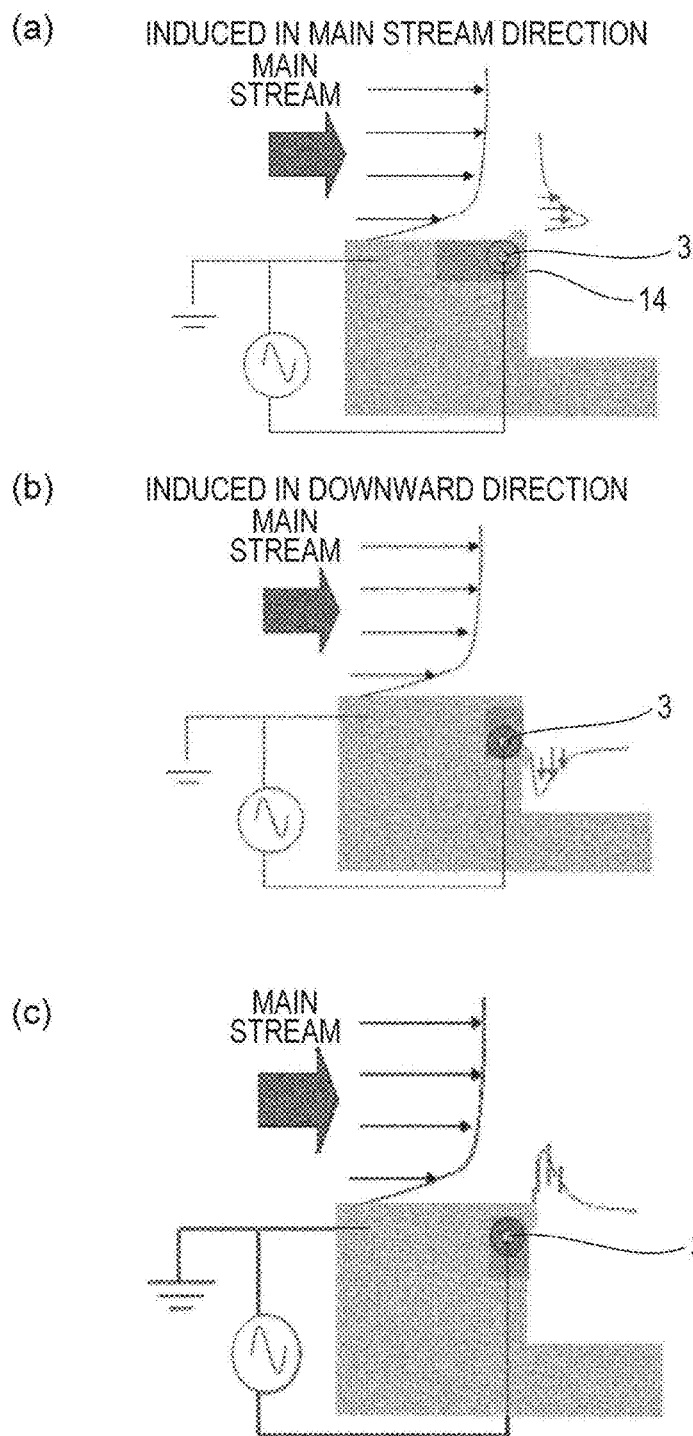
FIG. 21 shows a configuration of Example 7, according to which a wire plasma actuator is applied to a stepped portion of an automobile.

In this example, the wire plasma actuator 3 is attached to a rear end corner of a stepped portion of an automobile. FIG. 21 shows an example where this plasma actuator is applied to a truck. A rear end of a cabin serves as a stepped portion 14. In FIG. 21(*a*), the insulation coated conductor 3 included in the wire plasma actuator is positioned near the stepped portion 14. The insulation coated conductor 3 is disposed at a neighborhood of a rear end of a cabin ceiling to extend along a rear end of a groove press-formed in the vehicle body width direction, and flush-mounted with use of putty.

By applying the high-voltage high-frequency signal between the cabin serving as the conductive metal casing and the conducting wire of the insulation coated conductor 3, an induced gas flow is generated by the surface plasma to flow in a main stream direction of travelling air.

This configuration can reduce the separation of the travelling air from the rear end of the cabin, and also reduce the low pressure region formed at the rear wall of the cabin and the vibration flow of the cabin rear stream. Accordingly, the aerodynamic characteristics are improved.

FIG. 21(*b*) shows an induced gas flow generated when the conducting wire 3 is attached to the lower end of the recess located at the upper position of the cabin rear surface, while FIG. 21(*c*) shows an induced gas flow generated when the conducting wire 3 is attached to the upper end of the recess located at the upper position of the cabin rear surface. The selection may be made suitably in accordance with the aerodynamic characteristics of the cabin.

Example 8

Application to Pantograph

In this example, the plasma actuator according to the aspect of the invention is applied to a pantograph to reduce the flow noise.

A collector shoe of the pantograph is made of an insulating material casing, or of a conductive metal. In this example, the wire plasma actuator according to the aspect of the invention is attached to the conductive metal casing, and the principle of the induced flow generation will be described with reference to a basic configuration example.

Figure 22:
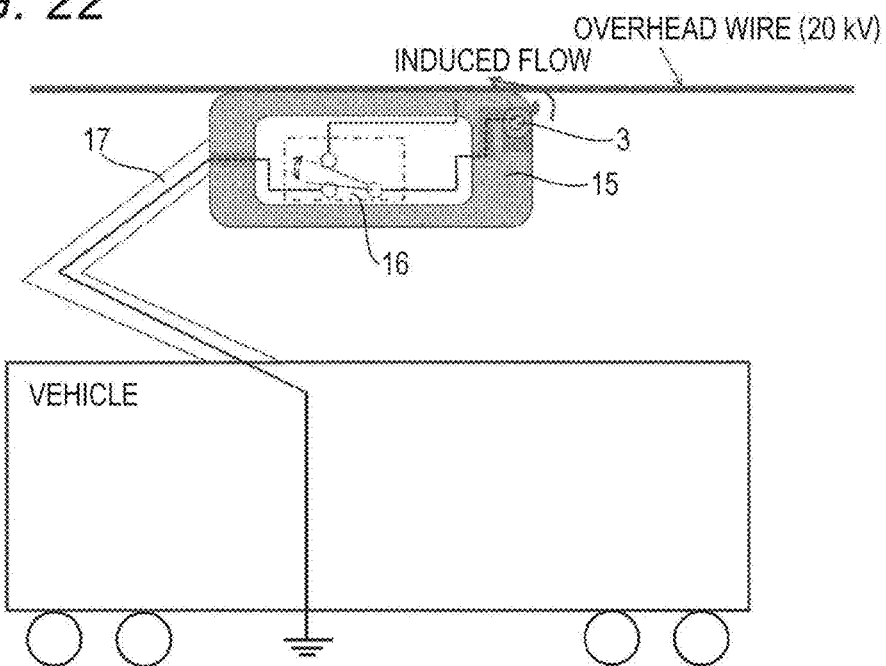
FIG. 22 shows a configuration of Example 8, according to which a wire plasma actuator is applied to a pantograph.

In this example, a collector shoe 15 of a pantograph illustrated in FIG. 22 is made of a conductive metal. The collector shoe 15 is attached with the insulation coated conductor 3 of the wire plasma actuator. In FIG. 22, a railroad vehicle travels rightward.

A front wall of the collector shoe 15, which is located at the front side in the traveling direction, is provided with the recess 8 (see FIG. 6) at an upper position. The insulation coated conductor 3 is positioned on the inner upper end of the recess 8, and flush-mounted with use of the putty 4 filled in the clearance of the recess 8. A high voltage switch 16, which is connected to one end of the insulation coated conductor 3 and is configured to switch between the high voltage of approximately 20 kV supplied from the overhead wire and the grounded side, is disposed inside the collector shoe 15. The other end of the insulation coated conductor 3 is grounded.

With this configuration, when the insulation coated conductor 3 is grounded to a rail via a high voltage switch 16, a arm 17, a vehicle body and a vehicle wheel, the surface plasma generates an induced flow to flow in the direction indicated by the arrow.

It is widely known that, when the railroad vehicle travels at a rapid speed, a vibration flow and Karman vortex are generated in the downstream of the collector shoe 15 due to the separation of the gas flow, and the noise level is proportional to the sixth power of the traveling speed.

As illustrated in FIG. 12, by generating the induced flow to flow upward from a front edge of the collector shoe 15 in the traveling direction, the gas flow separation can be prevented from occurring in the downstream of the collector shoe 15. Accordingly, the generation of the vibration flow and the Karman vortex can be prevented, and the noise can be reduced.

Figure 23:
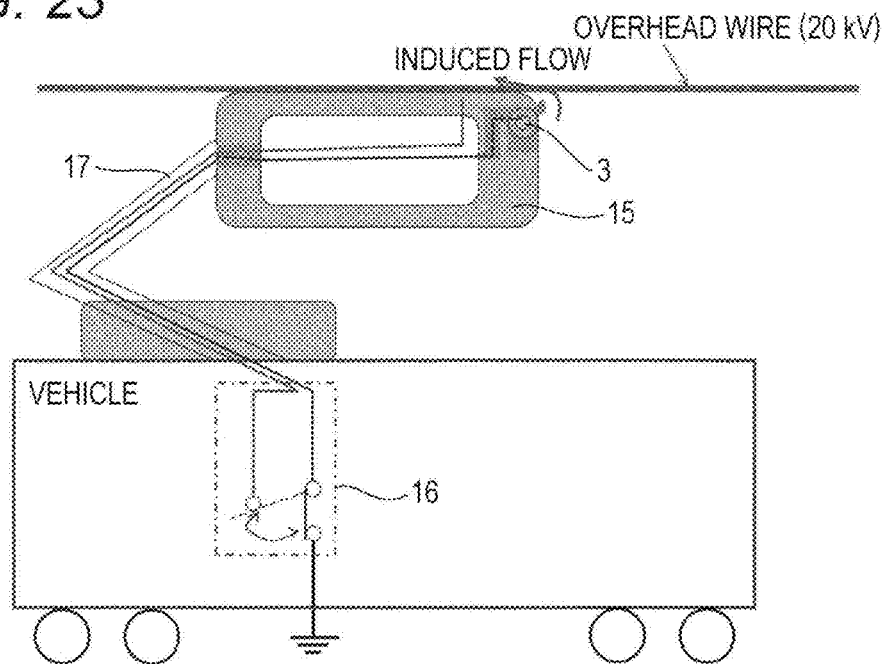
FIG. 23 shows a modification of Example 8, according to which the wire plasma actuator is applied to the pantograph.

As illustrated in FIG. 23, the high voltage switch 16 may be disposed within the vehicle body.

However, in either configuration, the high voltage switch 16 is required to be reliably insulated from the vehicle body. In this example, only the front wall of the collector shoe 15 at the front side in the traveling direction is embedded with the insulation coated conductor 3. Typically, the railroad vehicle shuttles back and forth at a terminal. Thus, a rear wall of the collector shoe 15, which is located on the left side in the drawing, is also embedded with the insulation coated conductor 3, and switching operation is made in accordance with the traveling direction.

The voltage applied to the insulation coated conductor 3 is between 20 kV of the overhead wire voltage and the grounding. Alternatively, the overhead wire voltage may be converted such that the voltage of ±10 kV is applied to the insulation coated conductor 3.

The high voltage switch 16 preferably conducts a rapid switching operation with use of a semiconductor device. The high voltage is preferably intermittently applied from the overhead wire to the insulation coated conductor 3 with a drive frequency of approximately 10 to 90% of a basic frequency, which is set, for instance, within the range of 100 Hz to 100 kHz.

For instance, when the basic frequency is set at 10 kHz and the drive frequency is set at 10% thereof, 1 kHz out of the basic frequency is used for switching to apply the high voltage from the overhead wire to the insulation coated conductor 3 for one second, and then the application of the high voltage from the overhead wire to the insulation coated conductor 3 is suspended with respect to the remainder of 9 kHz. Typically, the higher the basic frequency is, the faster the induced flow becomes, and the higher the ratio of the drive frequency becomes, the stronger the induced flow becomes. However, the higher the basic frequency and the ratio of the drive frequency become, the more the power consumption becomes. Accordingly, the basic frequency and the ratio of the drive frequency are optimally selected in accordance with the size and shape of the collector shoe 15 as well as the maximum traveling speed of the railroad vehicle during the traveling in order to effectively prevent the separation.

For instance, when the basic frequency is fixed at 10 kHz as described above, the drive frequency may be selected in the range of 55 Hz to 550 Hz if the train traveling speed is 100 km/h, in the range of 110 Hz to 1.1 kHz if the train traveling speed is 200 km/h, and in the range of 165 Hz to 1.7 kHz if the train traveling speed is 300 km/h, because the frequency of the Karman vortex is typically proportional to the speed.

Figure 24:
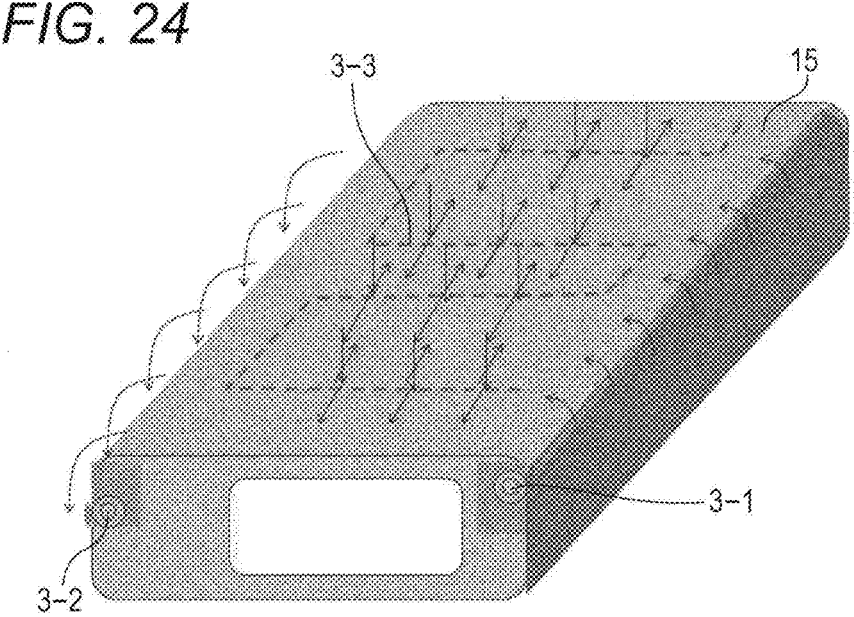
FIG. 24 shows an exemplary layout of Example 8, according to which the wire plasma actuator is applied to the pantograph.

FIG. 24 shows an example where, in order to generate the induced flow in the vehicle body width direction, the insulation coated conductors 3-1 and 3-2 are respectively attached to the front and rear edges of the collector shoe 15 to extend in the width direction of the railroad vehicle, and the insulation coated conductor 3-3 is disposed on the upper surface of the collector shoe 15 to form a zigzag shape.

The upper surface of the collector shoe 15 is provided with a zigzag recess. The insulation coated conductor 3-3 is disposed along the recess and flush-mounted by embedding the insulation coated conductor 3-3 in the recess with use of insulating putty or the like such that the upper surface of the collector shoe 15 becomes a uniform flat surface.

By applying the high-voltage high-frequency signal between the insulation coated conductor 3-3 and the collector shoe 15, an induced flow induced in the vehicle body width direction is generated by the surface plasma to flow along the upper surface of the collector shoe 15 as illustrated in FIG. 24. This configuration can prevent the separation of the gas flow on the entire upper surface of the collector shoe 15, and can stably control the uplifting power.

At this time, as illustrated in FIG. 10, an induced flow is generated from the upper side to the upper surface of the collector shoe 15 as seen in the axial direction of the insulation coated conductor 3-3, and the induced flow is divided into a right flow and a left flow. When the railroad vehicle travels at fast speed, a flow having a great momentum due to the induced flow is supplied from the upper side to the entire upper surface of the collector shoe 15. By uplifting the fluid having a small momentum near the upper surface, the separation can be effectively prevented.

The induced flow is generated as illustrated in the drawing by attaching the insulation coated conductor 3-1 to the upper end of the recess at the front edge (i.e., the upper side of the right lateral end surface in FIG. 24) of the collector shoe 15 and by attaching the insulation coated conductor 3-2 to the lower end of the recess at the rear edge (i.e., the upper side of the left lateral end surface in FIG. 24) of the collector shoe 15. This configuration can effectively prevent the gas flow separation during the rapid travelling, and reduce the noise due to the vibration flow and the Karman vertex.

When the railroad vehicle operates a shuttle service, two insulation coated conductors may be attached to each recess respectively at the upper end and the lower end of the recess, and switched in according with the traveling direction.

The position and range where the separation takes place differ depending on the conditions such as the size and shape of the collector shoe 15 and the maximum traveling speed of the railroad vehicle during the traveling. Therefore, it is effective to optimally position the insulation coated conductors 3-1 to 3-3 in accordance with the simulation based on the design conditions.

For instance, it may be effective to dispose the insulation coated conductor onto the entire right and left end surfaces of the collector shoe 15 in a zigzag shape like the upper surface of the collector shoe 15, or to generate the induced flow to flow through the bottom side of the collector shoe 15 by attaching the insulation coated conductors to the lower sides of the front and rear end surfaces to extend in the vehicle body width direction of the railroad vehicle. Accordingly, the positioning may be adjusted in accordance with the design conditions. The insulation coated conductor does not require a space. Therefore, the insulation coated conductor may be attached to the upper surface, bottom surface, front and rear end surfaces, and right and left end surfaces of the collector shoe 15, and the optimum insulation coated conductor may be selected in accordance with the design conditions of the vehicle and the vehicle speed.

Figure 25:
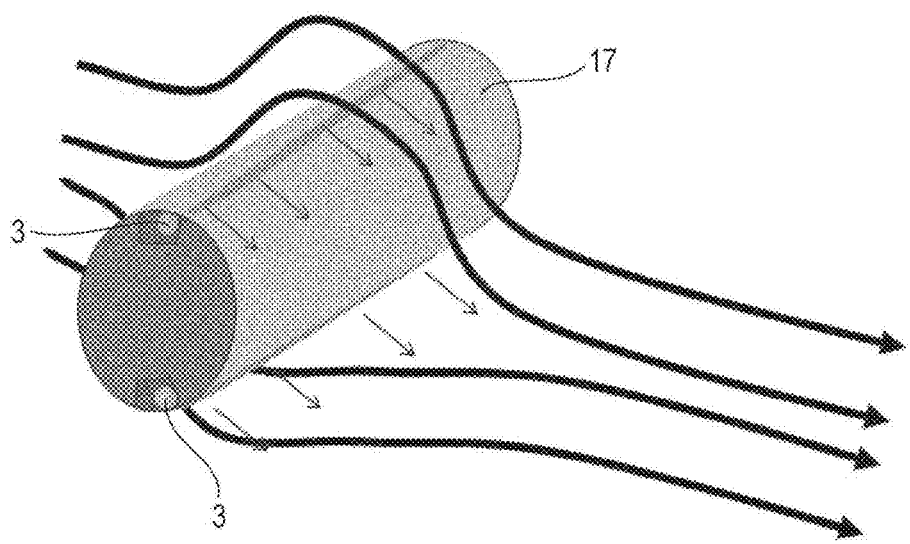
FIG. 25 shows an exemplary layout of Example 8, according to which the wire plasma actuator is applied to an arm of the pantograph.

FIG. 25 shows an example where the insulation coated conductor 3 is attached to the arm 17 that turns sideways.

In the drawing, by disposing the insulation coated conductor 3 on the upper end and the lower end of the arm 17 in the lengthwise direction, an induced flow is generated as indicated in the drawing. This configuration can effectively prevent the separation of the gas flow generated at each end of the arm 17 during the rapid travelling, and also reduce the noise due to the vibration flow and the Karman vertex.

When the collector shoe of the pantograph is made of an insulating material casing, the configurations as described with reference to FIGS. 1, 3 and 6 are applicable, and the similar advantageous effects can be obtained.

Example 9

Application to Turbine

In the following, an example of a pressure loss reducing device for use in fluid machinery where the leakage vortex can be controlled with use of the wire plasma actuator described above will described with reference to the attached drawing.

Figure 26:
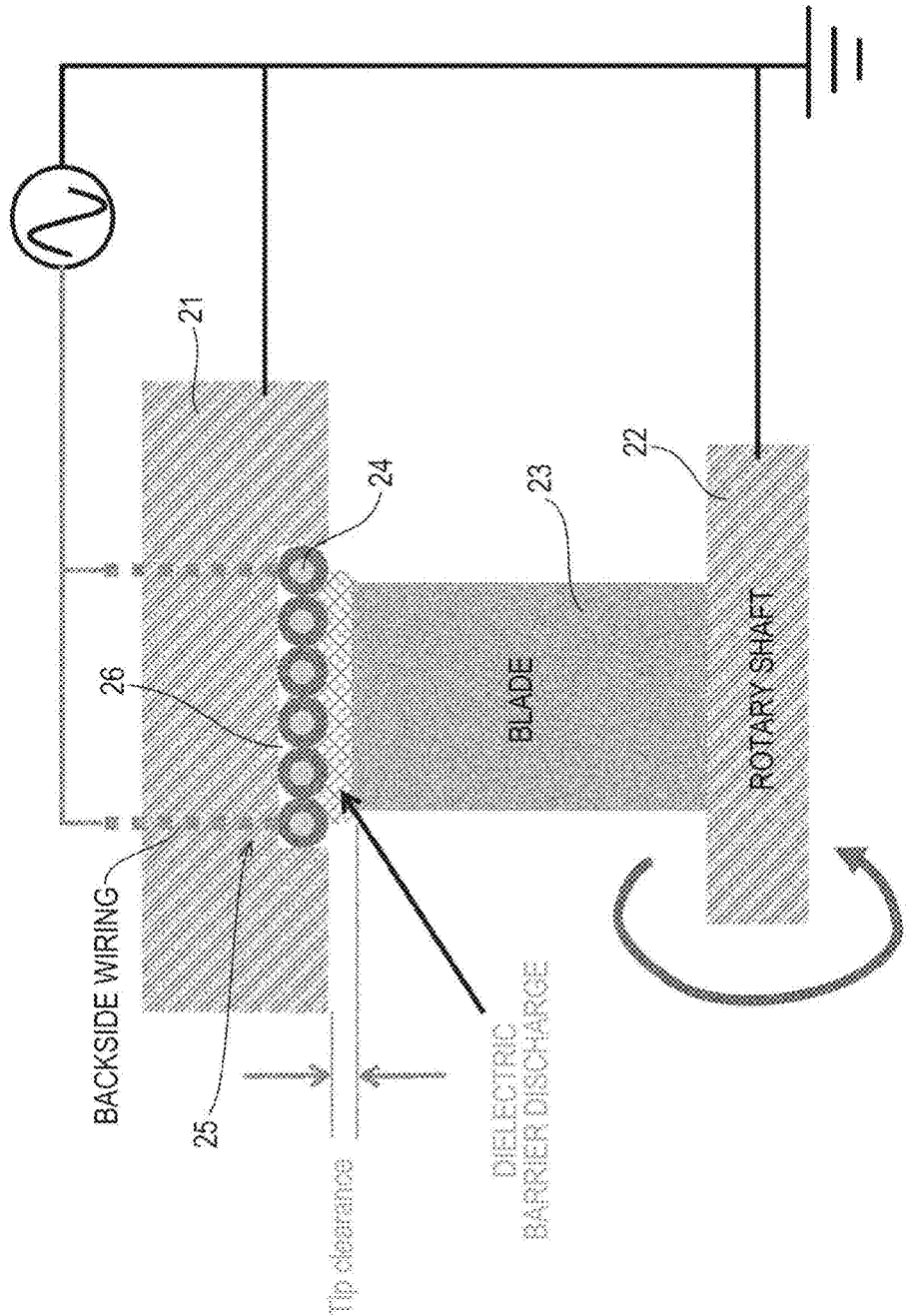
FIG. 26 shows a configuration of Example 9, according to which a wire plasma actuator is applied to a gas turbine.

In this example, the wire plasma actuator is applied to a gas turbine engine. In this example, as illustrated in FIG. 26, a wire plasma actuator 25 having an insulation coated conductor 24 is attached to an inner circumference of a conductive metal casing (casing) 21 to extend in the axis direction of a rotary shaft 22 while occupying a predetermined width. The wire plasma actuator 25 covers a tip clearance forming portion opposing to a turbine blade 23 that rotates about the rotary shaft 22. In this example, the wire plasma actuator 25 is mounted on a gas turbine having the metal casing 21. Needless to say, the wire plasma actuator is applicable to fluid machinery such as a gas turbine having an insulating material casing.

The wire plasma actuator 25 may be disposed not only on a side of the turbine blade 23 rotated by high temperature combustion gas, but also on a side of a compressor. In the example illustrated in FIG. 26, the wire plasma actuator 25 is attached to the inner circumference of the portion of the metal casing 21 that defines the tip clearance with the turbine blade 23.

On the inner circumference of the metal casing 21, an arc recess, which is a ring recess 26 in this example, is formed along an outer circumference of the turbine blade 23. The recess 26 has a predetermined width extending in the axis direction of the rotary shaft 22, and covers a region from the upstream to downstream of the blade 3 as seen in the axis direction of the rotary shaft 22. The insulation coated conductor 24 is disposed within the recess 26, and fixed by adhesive having a high heat resistance, or by ring fixture made of an insulating material.

Figure 27:
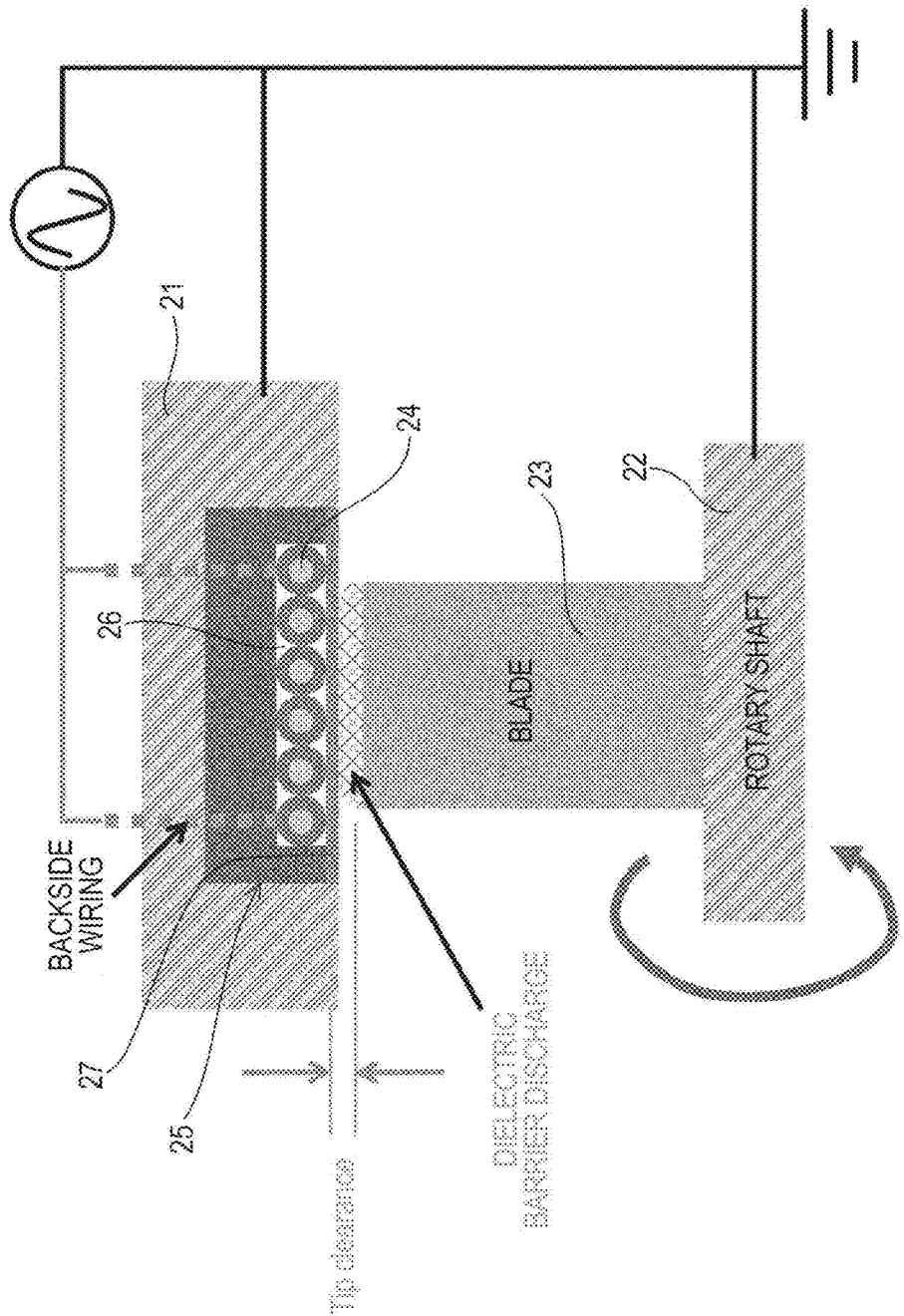
FIG. 27 shows an exemplary layout when the wire plasma actuator is applied to the gas turbine.

As illustrated in FIG. 27, an insulating guide 27 having high insulating capability and high heat resistance may be attached to the recess 26 formed on the inner circumference of the metal casing 21. The insulating guide 27 is made of, for instance, a fine ceramic made of alumina, silicon nitride or the like, or quartz glass or sapphire.

When the wire plasma actuator 25 is disposed on a side of the compressor of the gas turbine under the environment in which the temperature conditions are not so severe, the insulating guide 27 may be formed by filling an epoxy resin or a urethane resin.

Both ends of the insulating guide 27 in the axis direction are shaped to have a peripheral surface flushed with the peripheral surface of the metal casing 21 and to not form a stepped portion. The insulation coated conductor 24 included in the wire plasma actuator 25 is disposed in the recess 8 between the ends in the axis direction. In this example, the insulation coated conductor 24 is helically wound between the ends in the axis direction within the recess 26 of the insulating guide 27. As will be described below, the distribution of the dielectric barrier discharge generated in the axis direction of the rotary shaft 22 can be optimized preferably by a multi channel layout formed by disposing a plurality of insulation coated conductors 24 divided in the axis direction.

The insulation coated conductor 24 needs to secure the durability in accordance with the environment to be attached such as the vibration, flow speed and temperature generated during the operation of the fluid machinery. Therefore, depending on the fluid machinery to be applied, the insulation coated conductor 24 may be directly attached to the ring recess 26 formed on the inner circumference of the metal casing 21, or to the recess 26 formed between the ends of the insulating guide 27 in the axis direction. Alternatively, the insulation coated conductor 24 may be clamped to the recess 26 by the insulating guide 27.

Further, when the insulating guide 27 is made of a fine ceramic that is made of alumina, silicon nitride or the like, the recess and the insulation coated conductor 24 may be unitized together by embedding the insulation coated conductor 24 into the material, and shaping and sintering the same into an arc or ring shape, and such unit may be fitted into the inner circumference of the metal casing 21. With this configuration, the attachment and replacement can be facilitated.

Figure 28:
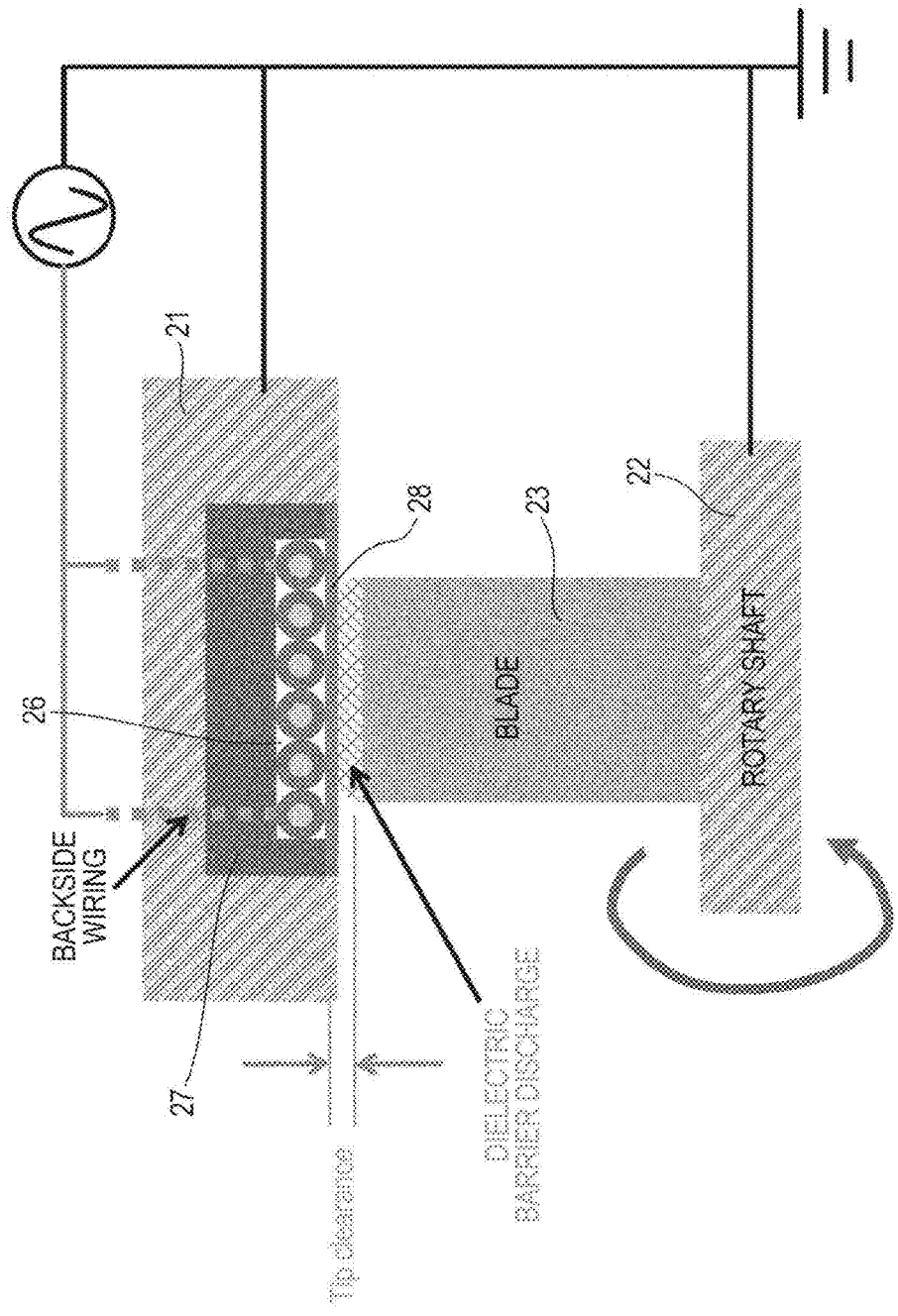
FIG. 28 shows another exemplary layout when the wire plasma actuator is applied to the gas turbine.

As illustrated in FIG. 28, the insulation coated conductor 24 may be flush-mounted by closing the recess 26 formed on the inner circumference of the metal casing 21 with an insulating plate 28 made of a material similar to the insulating guide 27.

The insulating guide 27 protects the insulation coated conductor 24 to enhance the durability, and suppresses the plasma from being generated on the back side of the metal casing 21 for the prevention of the damage and the energy loss of the metal casing 21 and the like. Thus, the insulating guide 27 serves to ensure the insulating capability of the insulation coated conductor 24.

If the sufficient insulating capability is secured by using only the insulating guide 27, the insulation coated conductor 24 may not necessarily be used. At such time, the conducting wire may be directly disposed thereto and the insulating guide 27 itself may serve as the insulating film. However, in order to secure the insulating capability of the portion taken out from the insulating guide 27, the use of the insulation coated conductor 24 is still advantageous.

When the insulation coated conductor 24 is attached to the metal casing 21 so as to oppose to a wing end of a turbine blade 23 rotated by high temperature combustion gas, the insulating guide 27 is made of, for instance, a machinable ceramic having a heat resistance for a heat of 1000° C. or more. When the insulation coated conductor 24 is positioned to oppose to the wing end of the compressor side, the insulating guide 27 is made of, for instance, Teflon Bakelite having a heat resistance for a heat up to approximately 200° C.

In addition, when the insulation coated conductor 24 is attached to fluid machinery such as a typical axial flow ventilator, compressor or turbine, or centrifugal ventilator, compressor or turbine, the insulating guide 27 may be made of an epoxy resin or urethane resin as described above.

In FIGS. 26 to 28, at each end of the recess 26 formed on the inner circumference of the metal casing 21, the insulation coated conductor 24 is connected to a power supply circuit configured to output a high-voltage high-frequency signal via back wiring provided in the metal casing 21. In short, the high-voltage high-frequency signal is applied between the grounded metal casing 21 and the insulation coated conductor 24 and between the turbine blade 23 grounded via the rotary shaft 22 and the insulation coated conductor 24. In each drawing, in order to secure the insulating capability with a simple connection configuration, each end of the insulation coated conductor 24 is connected to the power supply circuit configured to output the high-voltage high-frequency signal. Alternatively, one end of the insulation coated conductor 24 may be sealed within the metal casing 21 while the insulating capability thereof is secured by, for instance, an insulating plug.

As described above, the turbine blade 23 is grounded via the rotary shaft 22. Therefore, by applying the high-voltage high-frequency signal to the plural insulation coated conductors 24 disposed in the ring recess 26 formed on the inner circumference of the metal casing 21 to extend in the circumferential direction, the dielectric barrier discharge is generated between the wire plasma actuator 25 and the outer periphery end of the turbine blade 23 opposing thereto. As illustrated in FIG. 29, the dielectric barrier discharge generates an induced flow that flows from the insulation coated conductor 24 disposed on the inner circumference of the metal casing 21 toward the outer periphery end of the turbine blade 23. In the example illustrated in FIG. 29, nine insulation coated conductors 24 are helically wound so as to cover the tip clearance forming portion.

Figure 30:
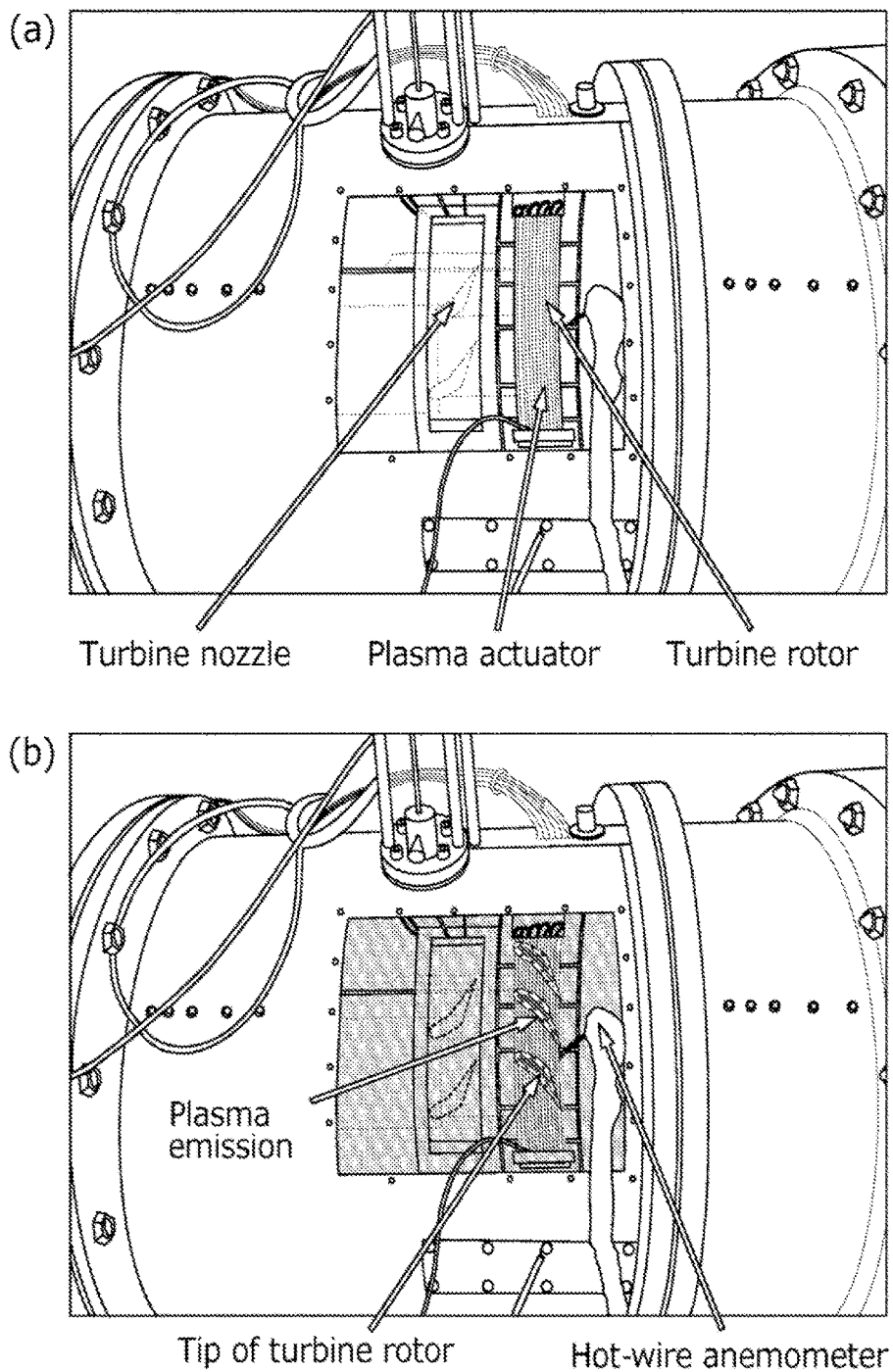
FIG. 30 shows experiment apparatus used when the wire plasma actuator is applied to the gas turbine.

FIG. 30(*a*) shows actual experimental apparatus. In this apparatus, the insulation coated conductor 24 is provided to the metal casing 21 to extend in the circumferential direction as well as to oppose to the annular turbine wing lattice. For the visualization, the metal casing 21 is partially provided with a glass window. Since the images of the wing lattice of the turbine blades (rotors) 23 and the wing lattice of the upstream turbine stator and the plasma generation are not clear, these are indicated by chain lines and arrows.

When the turbine blade 23 is rotated and the high-voltage high-frequency signal is applied to the insulation coated conductor 24, it has been observed as illustrated in FIG. 30(*b*) that the plasma is generated on the outer peripheral end of the turbine blade 23 and that the plasma generates an induced flow that flows from the insulation coated conductor 24 toward the outer peripheral end of the turbine blade 23.

Typically, in a gas turbine, the circumferential speed of the blade distal end is designed to be smaller than the speed of sound (Mach one) so as to not generate a shock wave. At this time, the circumferential speed of the blade distal end is approximately 300 to 400 m/s.

The amount of leakage flow that is leaked through the tip clearance is approximately several % of the amount of the main flow. The voltage and frequency applied between both ends of the insulation coated conductor 24 are selected in order to generate the induced flow between the insulation coated conductor 24 and the outer peripheral end of the turbine blade 23 opposing to the insulation coated conductor 24 for sufficiently suppressing such leakage vortex from being leaked on the downstream side of the tip clearance.

FIG. 31 shows an example where the insulation coated conductor 24 is unitized by embedding the insulation coated conductor 24 into the insulating guide 27 made of a fine ceramic made of alumina, silicon nitride or the like.

The metal casing 21 is configured to be dividable within a surface perpendicular to the axis of the rotary shaft 22 near the center of the tip clearance forming portion. In the example illustrated in the drawing, a cutout is formed on an end of a divided metal casing 21 located at a position further downstream than the other divided metal casing 21.

On the other hand, a projection is formed on the outer circumference of the insulating guide 27. The projection is fitted into the cutout of the metal casing 21. An end of the insulating guide 27 located at a downstream position in the axis direction is jointed to an end surface of the recess formed on the inner circumference of the metal casing 21 to extend in the circumferential direction. With this configuration, the inner circumference of the metal casing 21 is flushed.

Then, by jointing an end of the upstream casing with an end of the downstream casing of the divided metal casings 21, the wire plasma actuator 25 can be easily attached to the tip clearance forming portion. The replacement thereof can be also facilitated.

By taking out both ends of the insulation coated conductor 24 from the recess formed on the outer circumference of the insulating guide 27, the taken out portions of the insulation coated conductor 24 can be rigidly structured.

The insulating guide 27 may not necessarily be integrated in the circumferential direction. The insulating guide 27 may be divided into plural portions in the circumferential direction, and each of such divided portions may be provided with a projection for taking out both ends of the insulation coated conductor 24. In this configuration, the projections may be fitted into the corresponding cutouts of the metal casing 21.

In addition, depending on the specification of the fluid machinery such as a gas turbine, the metal casing 21 may be preferably jointed so that the metal casing 21 is dividable within a surface in parallel to the axis direction of the rotary shaft 22, or the insulating guide 27 in which the insulation coated conductor 24 is embedded may be preferably attached thereto in the vertical direction.

Figure 32:
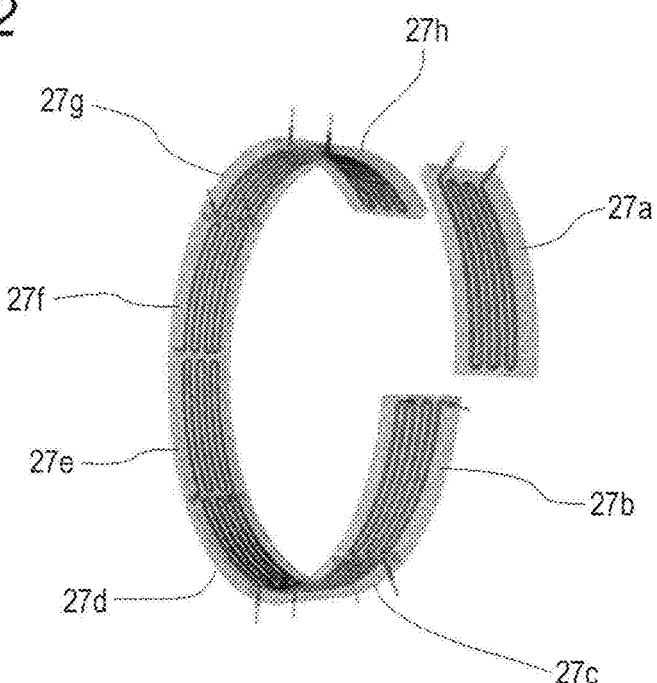
FIG. 32 shows an example of a dividable wire plasma actuator.

FIG. 32 shows a dividable wire plasma actuator attached to the inner circumference of the metal casing 21. In this example, the insulating guide 27 embedded with the insulation coated conductor 24 and made of a fine ceramic is divided into eight divisional parts 27*a* to 27*h*. The insulation coated conductor 24 is embedded into each insulating guide 27 from an end thereof in the circumferential direction, and wound in the insulating guide 27 to be taken out from the same side. The insulating guides 27*a* to 27*h* form a single unit. By sequentially fitting the insulating guides 27*a* to 27*h* into the recesses formed on the inner circumference of the metal casing 21, the cost is reducible. In addition, during the periodic maintenance, the replacement can be easily conducted.

Two insulation coated conductors 24 taken out from each of the insulating guides 27*a* to 27*h* are connected to the high-voltage high-frequency signal generator via a terminal disposed onto the outer circumference of the metal casing 21.

Figure 33:
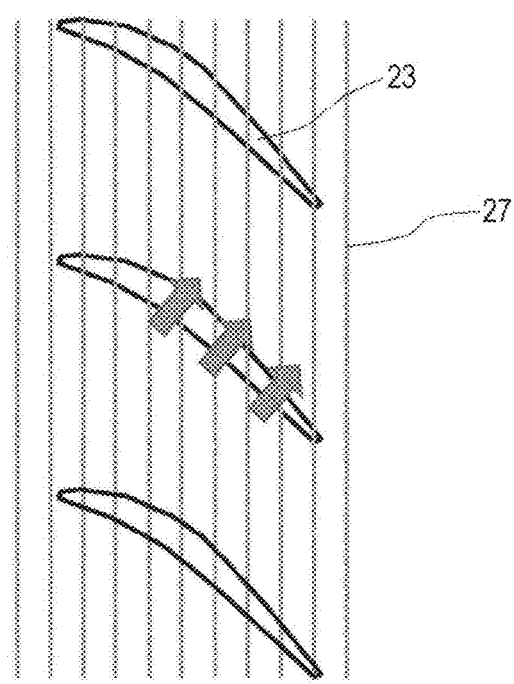
FIG. 33 shows an example where an insulation coated conductor is located perpendicularly to a rotation shaft of a gas turbine.
Figure 34:
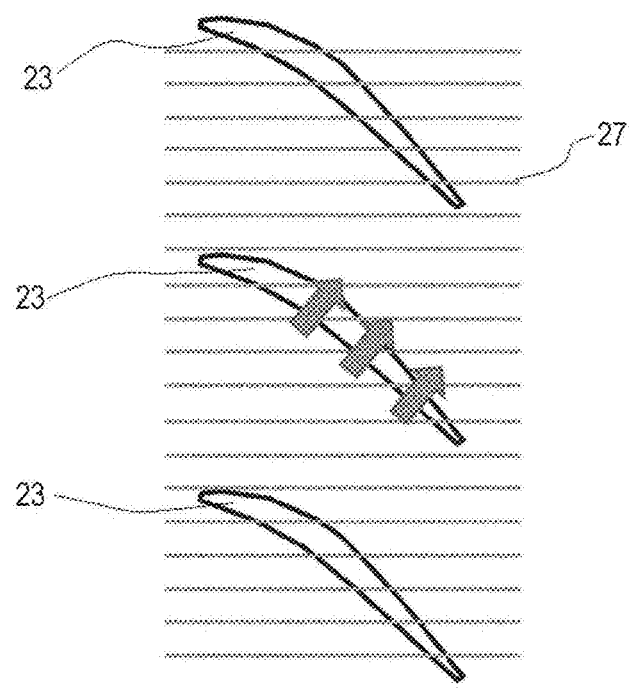
FIG. 34 shows an example where an insulation coated conductor is located in parallel to a rotation shaft of a gas turbine.

The pattern of the induced flow generated in response to the leakage flow differs depending on the orientation in which the insulation coated conductor 24 is disposed with respect to the gas turbine blade. FIG. 33 shows an example where the insulation coated conductor 24 is oriented to be perpendicular to the rotary shaft of the gas turbine, while FIG. 34 shows an example where the insulation coated conductor 24 is oriented to be in parallel to the rotary shaft of the gas turbine.

In addition to the above, by selecting the various layouts such as a layout in which the insulation coated conductor 24 is slanted from the rotary shaft of the gas turbine or a layout in which the insulation coated conductor 24 is wound, the specification of the gas turbine and the layout in which the flow leakage is reduced the most during the rated rotation are preferably selected.

Figure 35:
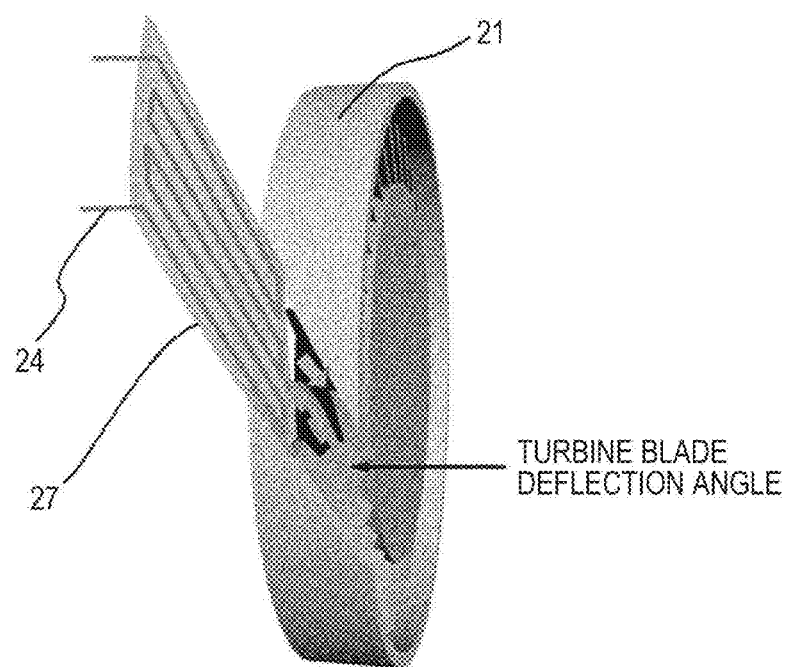
FIG. 35 shows an example where an insulation coated conductor is located diagonally to follow a deflection angle of a turbine blade.

FIG. 35 shows an example where the insulation coated conductor 24 extends along the deflection angle of the turbine blade, which is a transparent view so as to describe the relationship between the insulation coated conductor 24 and the turbine blade. The inner circumference of the metal casing 21 closer to the turbine blade is provided with a recess in a slanted direction so as to follow the deflection angle of the turbine blade. The insulating guides 27 embedded with the insulation coated conductor 24 and made of a fine ceramic is shaped to be fitted into the recess formed on the inner circumference of the metal casing 21. By attaching the insulating guides 27 made of a fine ceramic, the insulation coated conductor 24 is flush-mounted. In this drawing, the insulating guide 27 embedded with the insulation coated conductor 24 and made of a fine ceramic is provided at only a single position. Alternatively, the insulating guides 27 made of a fine ceramic may be preferably provided at plural positions along the circumferential direction.

Figure 36:
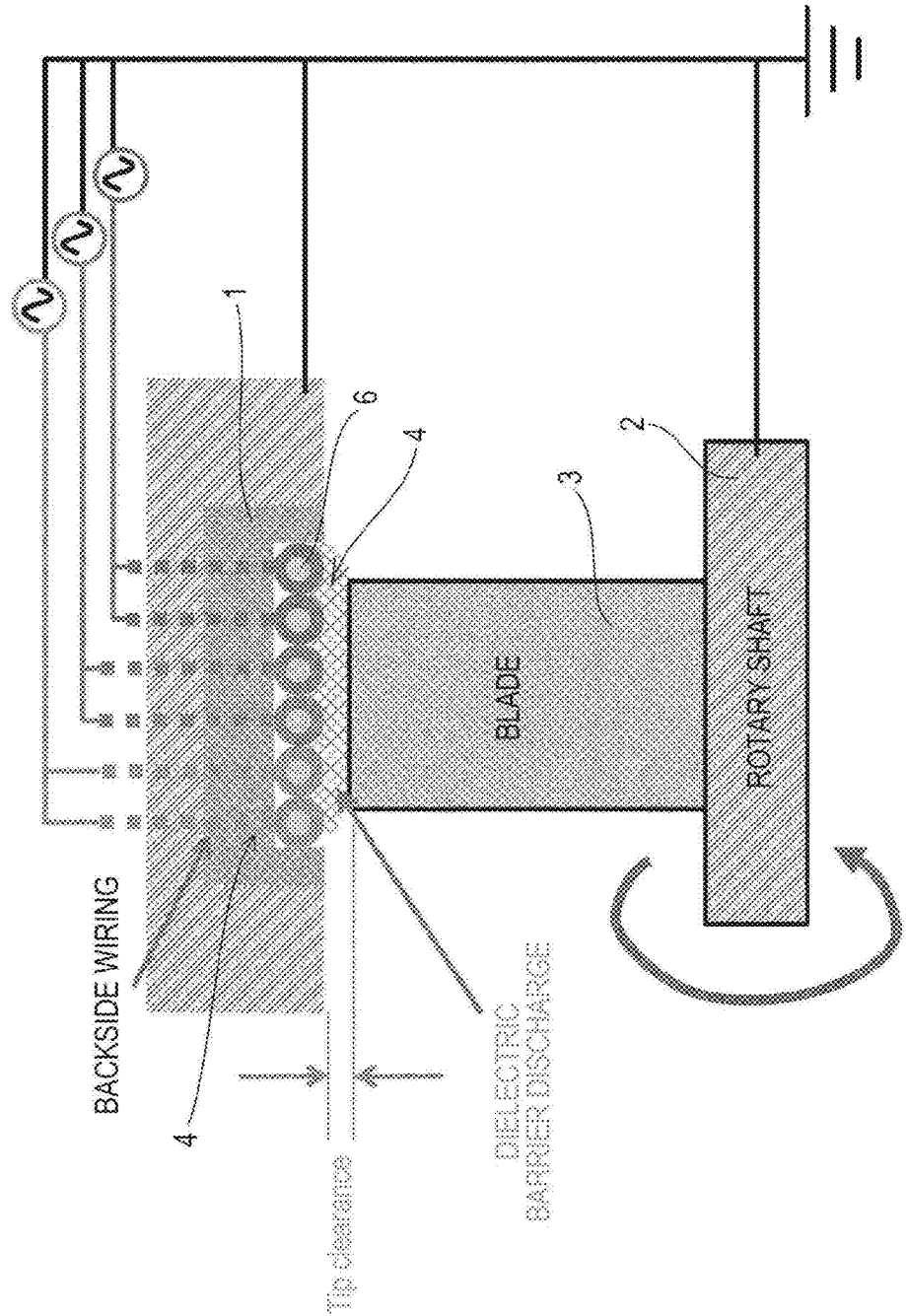
FIG. 36 shows an example where a wire plasma actuator has a multi-channel structure.

With respect to the layout of the wire plasma actuator 25 including the insulation coated conductor 24, as illustrated in FIG. 36, a multi channel layout is formed such that, for instance, three groups of an upstream group, a middle stream group and a downstream group are independently formed in the axis direction of the tip clearance and that each group is connected with an individual high-voltage high frequency power supply. In view of the suppression of the operative fluid leaked through the tip clearance, the voltage and frequency of the high-voltage high frequency wave applied to the insulation coated conductor 24 of each wire plasma actuator 25 can be adjusted or controlled to be an optimal value.

Figure 37:
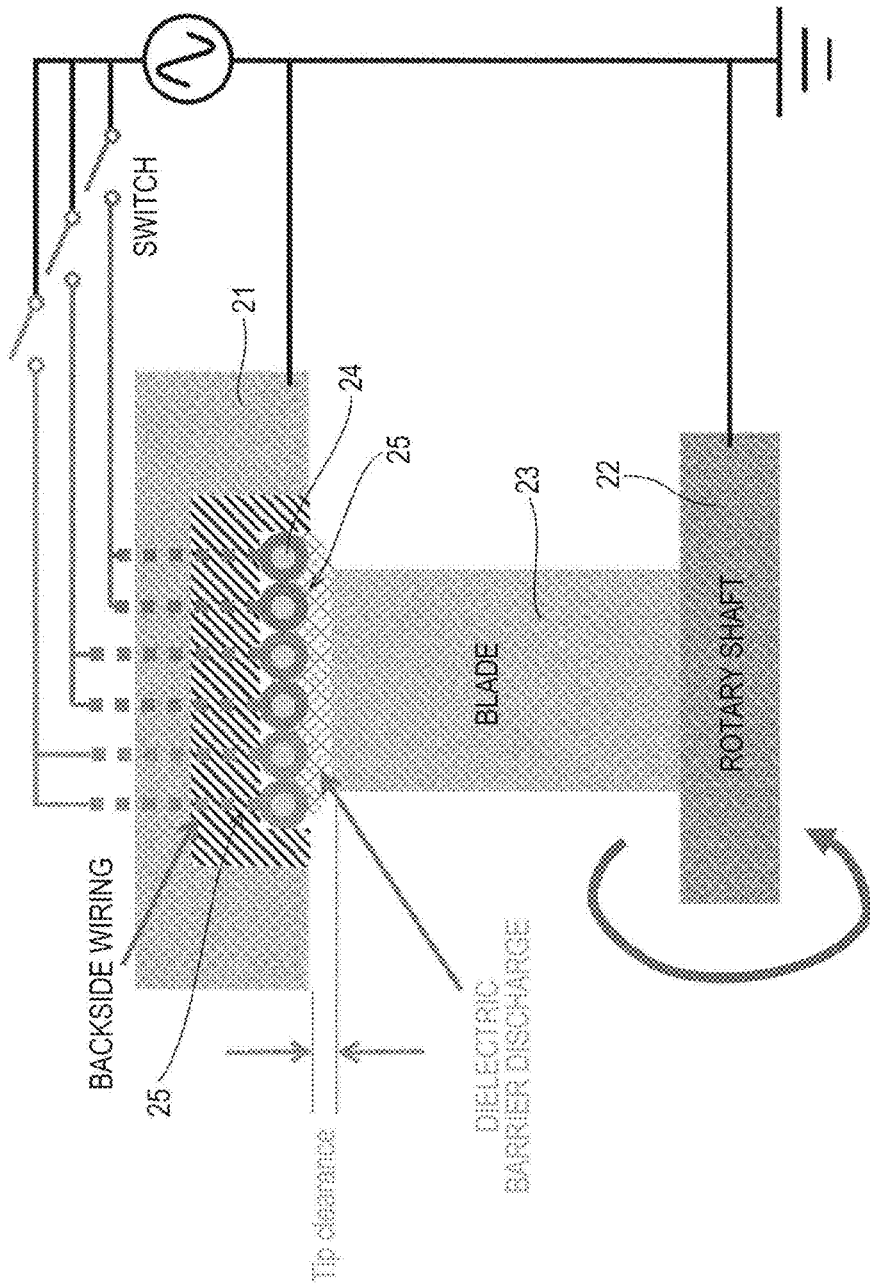
FIG. 37 shows another example where a wire plasma actuator has a multi-channel structure.

As illustrated in FIG. 37, by disposing three wire plasma actuators 25 at, for instance, an upstream position, a middle stream position and a downstream position in the axis direction of the tip clearance, and by connecting each wire plasma actuator to the high-voltage high frequency power supply via a switch, the voltage and frequency of the high-voltage high frequency wave is applied only to the insulation coated conductor 24 of the effective wire plasma actuator 25, in view of the suppression of the operative fluid leaked through the tip clearance. With this configuration, the power consumption can be reduced.

On the other hand, the induced flow generated by the plasma between the insulation coated conductor 24 and the outer peripheral end of the turbine blade 23 opposing to the insulation coated conductor 24 is also changed by the shape of the outer peripheral end of the turbine blade 23.

More specifically, as illustrated in FIG. 38(a), when the outer peripheral end of the turbine blade 23 is shaped to have corners at both ends in the circumferential direction as seen in the axis direction of the rotary shaft 22, the electric fields concentrate on the corners. Therefore, the dielectric barrier discharge is easily generated, and the plasma is intermittently generated in the circumferential direction of the outer peripheral end of the turbine blade 23. Thus, a strong induced flow cannot be generated.

In view of the above, as illustrated in FIG. 38(b), by selecting the shape of the outer end in the circumferential direction, e.g., by rounding the corners of both circumferential ends of the turbine blade 23 in arc shapes, the plasma is generated uniformly in the circumferential direction along the outer peripheral end of the turbine blade 23.

With this configuration, a strong induced flow is generated between the inner circumference of the casing and the outer end of the blade uniformly in the circumferential direction. Thus, the leakage vortex that is made through the tip clearance is more effectively suppressed.

In the examples described above, the gas turbine has been mainly described. However, the present invention is applicable not only to the gas turbine, but also to various fluid machines such as a centrifugal compressor and a radial turbine.

A centrifugal turbo machine such as a centrifugal compressor and a radial turbine is used as an automobile turbo charger and a power generating small gas turbine.

Figure 39:
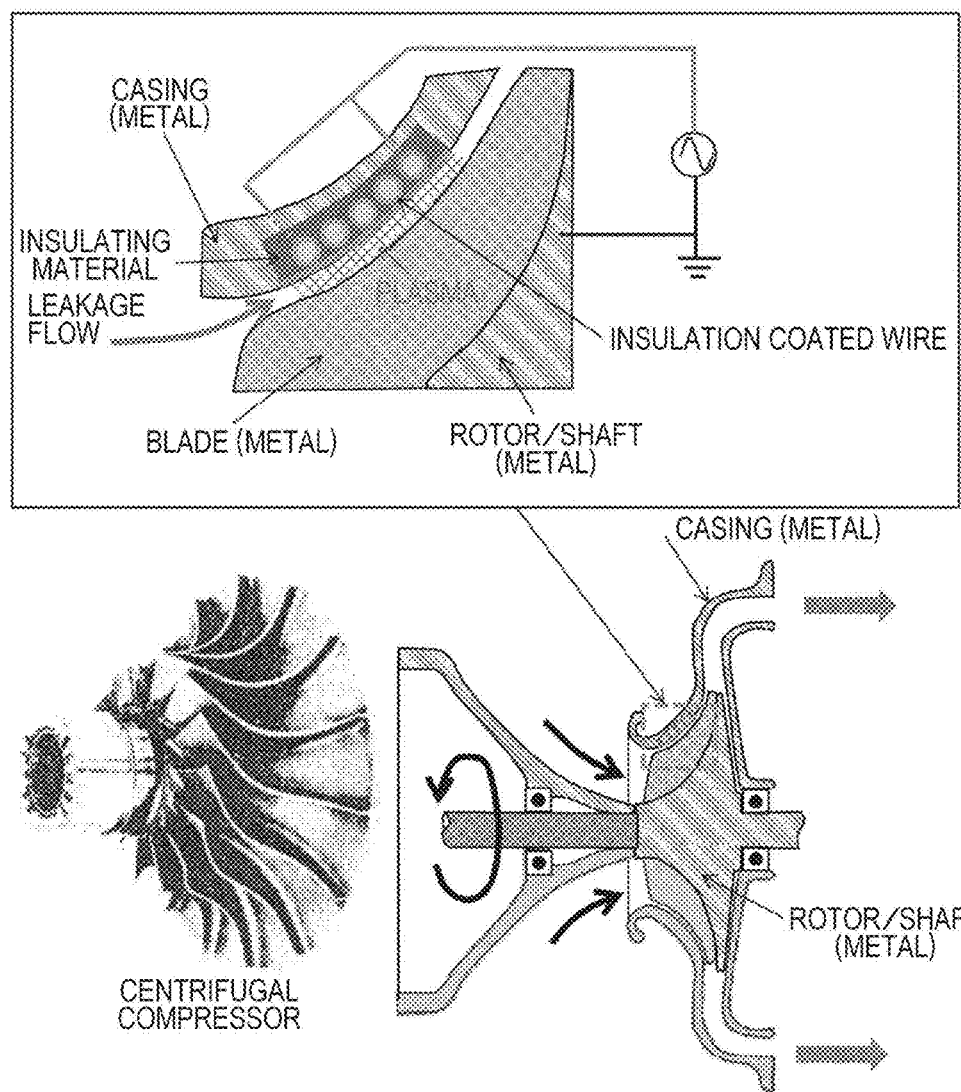
FIG. 39 shows an example where an induced flow generated between an insulation coated conductor and an outer peripheral end of a turbine blade is uniform.

In such a centrifugal turbo machine, the flow direction is curved from the axis direction to the radial direction, and the diameter of the blade and the casing is changed. Even in such a case, as illustrated in FIG. 39, the pressure loss can be reduced to substantially the same degree as in an axial flow turbo machine, by forming a ring recess on the inner circumference of the casing opposed to the blade outer end and by disposing the insulation coated conductor within the recess.

In general, the amount of the leakage due to the leakage vortex is increased substantially in proportion to the tip clearance. Therefore, in order to enhance the efficiency of the gas turbine and the like to the maximum, it is required to enhance the design precision of the turbine blade 23 and the bearing as much as possible or to select an expensive material having a small thermal expansion coefficient, which is prominently costly.

However, the plasma actuator described above is attachable to various fluid machines with prominently low cost. Accordingly, by suppressing the leakage amount due to the leakage vortex to, for instance, approximately one third, sufficient cost effectiveness can be obtained.

When the casing of the gas turbine is made of an insulating material, the insulation coated conductor 24 may not necessarily be employed, and the conducting wire may be attached to the casing. However, the wing end of the turbine blade 23 is required to be grounded. In particular, when the turbine blade 23 itself is also made of an insulating material, the wing end needs to be attached, for instance, with a conductive metal chip, and grounded via bosses and bearings with use of a conductive wire.

The wire plasma actuator 25 may be attached not only to the turbine blade 23 rotated by high temperature combustion gas, but also to a compressor. In the example illustrated in FIG. 29, the wire plasma actuator 25 is attached to the inner circumference of the metal casing 21 at a position where the tip clearance is defined with the turbine blade 23.

DESCRIPTION OF REFERENCE SIGNS

1 Insulating material casing
2 Recess
3, 24 Insulation coated conductor
4 Insulating putty
5 Tape electrode
6 Sheet electrode
7 Insulating material casing
8 Recess
9 Glass tube, ceramic tube
11 High pressure input conductor
12 Wing
14 Stepped portion of truck
15 Collector shoe of pantograph
16 High voltage switch
17 Arm of pantograph
21 Metal casing
22 Rotary shaft
23 Turbine blade
25 Wire plasma actuator
27 Insulating guide

The invention claimed is:
1. A surface plasma actuator, comprising:
an electrode attached to a surface of an insulating target object and formed from a conductive thin film or thin plate; and
an insulation coated conductor attached to the surface and disposed opposite the electrode along a lengthwise direction, the insulation coated conductor comprising a conductive wire and an insulation material coating, wherein
surface plasma is generated between the insulation coated conductor and the electrode by applying a pulse voltage between the electrode and the conductive wire, and an induced gas flow is generated by the surface plasma.
2. The surface plasma actuator according to claim 1, wherein the insulation coated conductor is flexibly attachable to a three-dimensional shape of the surface of the target object.

3. The surface plasma actuator according to claim 1, wherein
the insulation coated conductor is disposed within a recess or a groove formed in the surface of the target object and is flush-mounted to the target object with an insulating material filled in the recess or the groove, and
the electrode is attached along an end edge of the recess or the groove on the surface of the target object.

4. The surface plasma actuator according to claim 3, wherein the insulation coated conductor is in contact with an inner surface of the recess or the groove.

5. The surface plasma actuator according to claim 1, wherein the insulation coated conductor contacts the electrode.

6. The surface plasma actuator according to claim 5, wherein the insulation coated conductor is attached such that the conductive wire is disposed at a further outer position than the electrode with respect to the surface.

7. A surface plasma actuator, comprising:
a conductive target object; and
an insulation coated conductor attached to a surface of the target object, the insulation coated conductor comprising a conductive wire and an insulation material coating, wherein
surface plasma is generated between the insulation coated conductor and the surface of the target object by applying a pulse voltage between the target object and the conductive wire, and an induced gas flow is generated by the surface plasma.

8. The surface plasma actuator according to claim 7, wherein the insulation coated conductor is flexibly attachable to a three-dimensional shape of the surface of the target object.

9. The surface plasma actuator according to claim 7, wherein the insulation coated conductor is disposed within a recess or a groove formed in the surface of the target object and is flush-mounted to the target object with an insulating material filled in the recess or the groove.

10. The surface plasma actuator according to claim 9, wherein the insulation coated conductor is in contact with an inner surface of the recess or the groove.

11. The surface plasma actuator according to claim 7, wherein the insulation coated conductor is provided so as to be movable along the surface of the target object.

12. A pantograph for railroad vehicle, comprising:
a collector shoe;
an arm configured to support the collector shoe; and
an insulation coated conductor attached to a surface of either one of the collector shoe and the arm, the insulation coated conductor comprising a conductive wire and an insulation material coating, wherein
surface plasma is generated between the insulation coated conductor and the surface of either one of the collector shoe and the arm by applying a pulse voltage between either one of the collector shoe and the arm and the conductive wire, and an induced gas flow is generated by the surface plasma.

13. The pantograph according to claim 12, wherein the insulation coated conductor is flexibly attachable to a three-dimensional shape of the surface of either one of the collector shoe and the arm.

14. The pantograph according to claim 12, wherein
the collector shoe comprises a recess that extends in a widthwise direction of the railroad vehicle, the recess being provided at a front edge or a rear edge of the collector shoe in a traveling direction of the railroad vehicle, and
the insulation coated conductor is disposed within and along the recess and is flush-mounted with an insulating material filled in the recess.

15. The pantograph according to claim 12, wherein
the collector shoe comprises recesses that extend in a widthwise direction of the railroad vehicle, the recesses disposed respectively at a front edge and a rear edge of the collector shoe in a traveling direction of the railroad vehicle,
the insulation coated conductors are disposed at upper and lower positions within each of the recesses provided at the front edge and the rear edge, and
the pulse voltage is applied to either one of the upper and lower insulation coated conductors in accordance with the traveling direction of the railroad vehicle.

16. The pantograph according to claim 15, wherein the insulation coated conductors each are further disposed in zigzags on an upper surface of the collector shoe.

17. The pantograph according to claim 12, wherein
the arm comprises a recess that extends in a lengthwise direction of the arm, the recess disposed at a lateral portion of the arm in a traveling direction of the railroad vehicle, and
the insulation coated conductor is disposed within and along the recess.

18. The pantograph according to claim 12, further comprising a high voltage switch configured to apply the pulse voltage to the conductive wire of the insulation coated conductor by periodically switching between an overhead wire voltage and a grounding voltage.

* * * * *